(12) United States Patent
Kikuchi et al.

(10) Patent No.: US 7,340,767 B2
(45) Date of Patent: Mar. 4, 2008

(54) CAMERA APPARATUS, IMAGE SERVER AND IMAGE SERVER SYSTEM

(75) Inventors: Kenichi Kikuchi, Kurume (JP); Toshihiro Fujiki, Ogoori (JP)

(73) Assignee: Matsushita Electric Industrial Co, Ltd., Osaka (JP)

( * ) Notice: Subject to any disclaimer, the term of this patent is extended or adjusted under 35 U.S.C. 154(b) by 770 days.

(21) Appl. No.: 10/874,328

(22) Filed: Jun. 24, 2004

(65) Prior Publication Data

US 2004/0263673 A1    Dec. 30, 2004

(30) Foreign Application Priority Data

Jun. 26, 2003   (JP)   ............... 2003-182326
Jun. 26, 2003   (JP)   ............... 2003-182327
Sep. 18, 2003   (JP)   ............... 2003-325838

(51) Int. Cl.
*H04N 7/173*   (2006.01)
*H04N 5/225*   (2006.01)
*H04N 5/235*   (2006.01)
*H04N 5/232*   (2006.01)

(52) U.S. Cl. ............... 725/105; 348/216.1; 348/229.1; 348/345; 348/362

(58) Field of Classification Search ............. 348/216.1, 348/229.4, 230.1, 296, 345, 349, 353, 356, 348/362, 207.1, 211.3; 725/105
See application file for complete search history.

(56) References Cited

U.S. PATENT DOCUMENTS 4,959,727 A     9/1990   Imaide et al.
5,880,777 A *   3/1999   Savoye et al. ........... 348/217.1
6,421,086 B1 *  7/2002   Kuno et al. .............. 348/312
6,441,845 B1    8/2002   Matsumoto
6,518,998 B1 *  2/2003   Christoff et al. ........ 348/216.1
6,882,363 B1 *  4/2005   Oda et al. ............... 348/226.1
6,958,778 B2 * 10/2005   Fukushima ............... 348/363
6,972,798 B1 * 12/2005   Takei ..................... 348/349
6,972,800 B2 * 12/2005   Sano et al. .............. 348/362
7,136,095 B2 * 11/2006   Patej ...................... 348/216.1
7,161,629 B2 *  1/2007   Suzuki et al. ............ 348/362

FOREIGN PATENT DOCUMENTS

JP          1305671         12/1989

OTHER PUBLICATIONS

Chinese Office Action dated May 11, 2007 with English translation.

* cited by examiner

*Primary Examiner*—John M. Villecco
(74) *Attorney, Agent, or Firm*—Stevens, Davis, Miller & Mosher, LLP.

(57) ABSTRACT

An image server includes: a focus position control unit for determining a focus position based on a maximum value of focus evaluation detected by a picture signal level detection unit; and a focus lens driver for moving the focus lens in predetermined control volumes based on an instruction from the focus position control means; characterized in that, in case the exposure time is changed to a longer cycle than a predetermined cycle, the focus position control unit determines a large control volume corresponding to the change in exposure time and moves the focus lens with the control volume to detect the maximum value of focus evaluation and performs focus control.

28 Claims, 20 Drawing Sheets

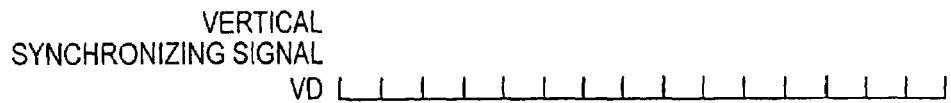
FIG. 5A
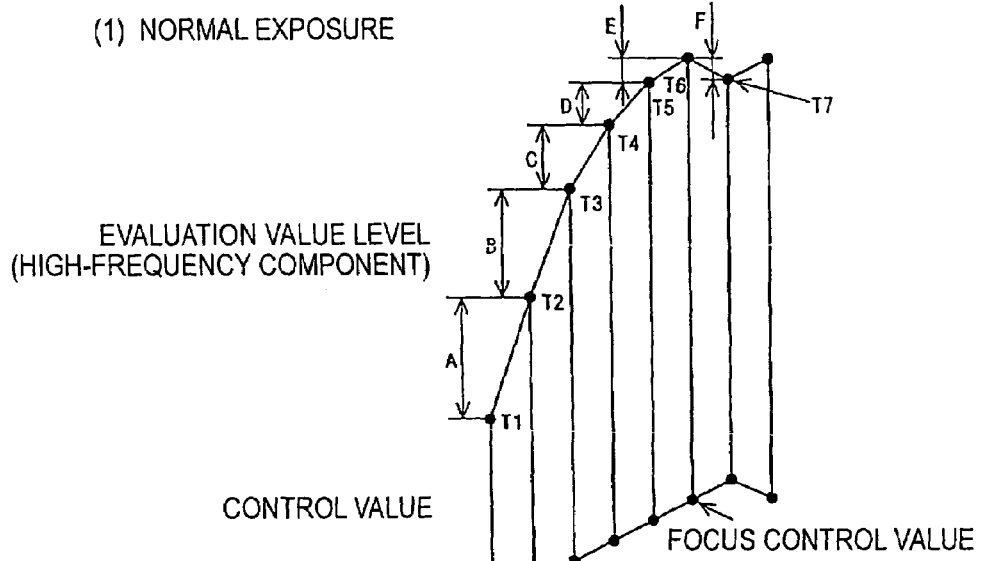
FIG. 5B
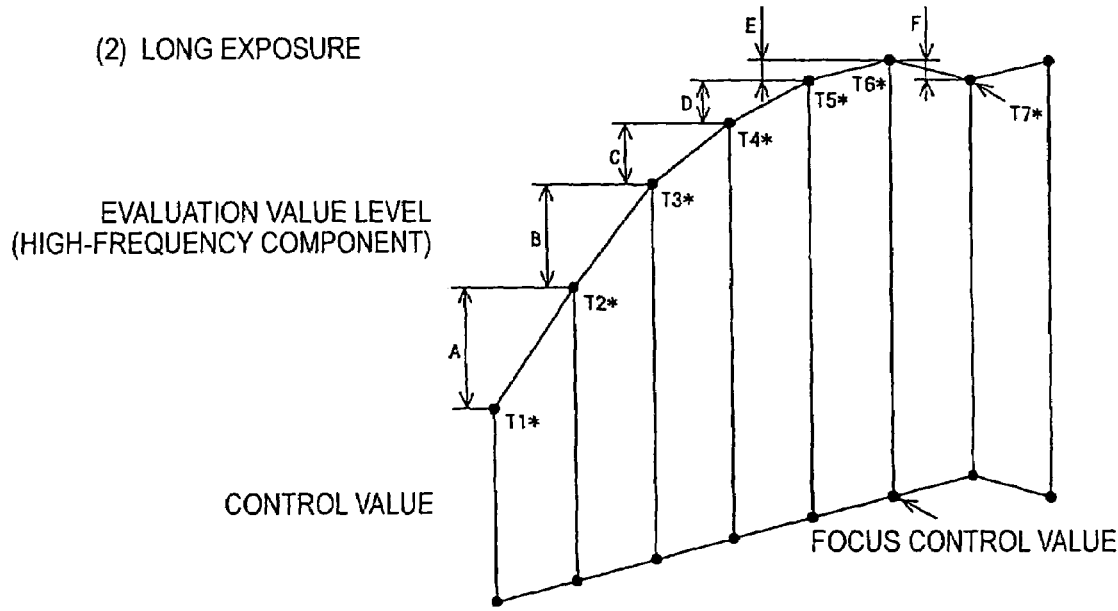

CAMERA APPARATUS, IMAGE SERVER AND IMAGE SERVER SYSTEM

CROSS REFERENCE TO RELATED APPLICATION

This application is based upon and claims the benefit of priority of Japanese Patent Application Nos. 2003-182326 and 2003-182327 both filed on Jun. 26, 2003 and No. 2003-325838 filed on Sep. 18, 2003, the contents of which are incorporated herein by reference in its entirety.

BACKGROUND OF THE INVENTION

The present invention relates to an image server which allows the user to photograph a picture as the user performs remote control of a camera via a network such as the Internet and which transmits stable image data, and an image server system which connects the image server and a client terminal via a network.

In recent years, an image server is attracting public attention which allows the user to remotely control a camera via a network such as the Internet to obtain an image. Such an image server changes the exposure time when the subject darkens and switches from the normal exposure mode to the long exposure mode. In case the mode is switched from the normal exposure mode to the long exposure mode, control information for automatic control such as Auto Gain Control (hereinafter referred to as the AGC control), Auto Iris (hereinafter referred to as the AI), Auto White Balance (hereinafter referred to as the AWB), and Auto Focus (hereinafter referred to as the AF) cannot properly follow the change caused by extension of the exposure cycle. That is, in the normal exposure mode, the control information for AGC, AI, AWB and AF is obtained per frame in a predetermined cycle to perform automatic control and transmit an image data. In the long exposure mode, evaluation value information is fixed for a long cycle. This leaves a strong sense of incongruity when the normal exposure mode is switched to the long exposure mode. Moreover, such an image server cannot follow a rapid change in brightness, for example. In such a case, the client performs control only after the information, resulting in poor camera operability with a delay in response.

In order to prevent a time delay before a favorable output image is obtained due to a change in the incident light volume on entering the long exposure mode, imaging apparatus has been proposed which comprises means for decreasing the response speed of automatic signal volume control only in the long exposure mode (see Japanese Patent Laid-Open No. 305671/1989).

As mentioned hereinabove, a related art image server cannot follow a change caused by an extended exposure cycle. In the long exposure mode, evaluation value information is fixed for a long cycle, and the server has failed to follow for example a rapid change in brightness. Moreover, when the focus is dislocated, the out-of-focus state persists, an acceptable phenomenon. While the imaging apparatus according to Japanese Patent Laid-Open No. 305671/1989 prevents iris oscillation by delaying the response speed in order to follow the switching between exposure modes, particular disclosure is not found concerning the Auto Focus mechanism.

Among several methods for detection a focus position in the Auto Focus mode, a method for using the high-frequency component of a picture signal is often used by a network camera. FIG. 4 illustrates the principle of related art Auto Focus control. FIG. 5A shows the evaluation value level of Auto Focus and its control value of a related art image server in the normal exposure mode. FIG. 5B shows the evaluation value level of Auto Focus and its control value of the image server shown in FIG. 5A in the long exposure mode. In case a picture signal is used to detect a focus position, the high-frequency component of the picture signal shows its maximum value while the focus is achieved, as shown in FIG. 4. This is because a picture in focus has a steep contour, which means a rich high-frequency component is contained. From this characteristic, the focus position is at the maximum value of the hill of the high-frequency component or where the gradient is 0.

The related art AF control which achieves focus by using this characteristic is shown in FIGS. 5A and 5B. The evaluation value of focus used in this example is a high-frequency component extracted from the picture signal mentioned above. When the subject is out of focus, the level of the focus evaluation value is low. As the subjects gradually becomes in focus, the level rises and reaches a maximum value when the focus is achieved. Thus, in the related art, a focus lens travels in the direction where the level of the evaluation value increases and a position where the maximum value is obtained is determined as a focus position.

In pursuit of a focus position, the focus lens travels in equal distances in accordance with the control value. The term "equal distances" is used for simplicity and the real control procedure will be given later. For the long exposure time, an instruction for movement is issued per 1V (timing period of vertical synchronizing signal). The focus lens travels in equal distances in the direction where the level of the focus evaluation value rises. As shown in FIG. 5A, the focus evaluation value rises with a change in control value (travel of the focus lens) and reaches a maximum value at a point. Then the evaluation value level drops at time point T7. This shows that the focus evaluation value has dropped after it has peaked. This trend indicates that the control value (travel position of focus lens) immediately preceding the point where the focus evaluation value has dropped can be employed as a focus control value. Thus the focus lens is set to this value.

In the long exposure mode, the cycle where a picture signal is obtained is extended with the extension of the exposure period, and accordingly the signal level detection cycle is extended, and the cycle where the focus lens position is set is extended as a matter of fact. All this phenomena result in a slower response. While FIG. 5B shows a double exposure time where the exposure time is double the normal exposure time, the response time until focusing exceeds double that in normal exposure as the period until the focus evaluation value reaches a maximum value (time until t7*) exceeds double that in the normal exposure. In the related art image server and image server system, position setting of the focus lens is extended while in the long exposure mode. This takes time in focus control, with poor responsivity.

While the focus lens travels in equal distances in the foregoing example, focus evaluation values of various magnitudes are obtained so that the travel volume is controlled with relation to the gradient in order to accommodate this phenomenon. A gradient is detected at the start of control. When the gradient is larger than a predetermined value, the dislocation of focus is assumed to be large so that control is made using a large travel volume. In case the gradient is smaller than the predetermined value, the current position is near a peak so that control is made using a small travel volume. The former indicates a hill-climbing phase to approach a peak while the latter is a phase for checking the peak position. The travel volume is changed in accordance with the gradient in a phase also.

Assuming that the motor for driving a focus lens is a stepping motor, the focus lens travels while being rotated in 16 steps, 12 steps or 8 steps in accordance with the gradient in a hill-climbing phase with steep gradient. In a peak-checking phase with mild gradient, the focus lens travels while being rotated in 4 steps, 2 steps or 1 step in accordance with the gradient. Focusing takes time when in the long exposure mode even in case the travel volume is changed between phases. Thus the responsivity remains poor.

Further, as mentioned above, an image server according to the related art transmits to a client an image of a subject which gives a visual sense of incongruity due to a sudden increase in the brightness of the subject during switchover between exposure modes. In this way, the image server and the image server system according to the related art has no other choice than transmit am image which gives a visual sense of incongruity for example when the system has entered the long exposure mode.

SUMMARY OF THE INVENTION

The invention has as an object to provide an image server which assures focusing operation with no delays and maintains high controllability despite a change in exposure time and which is capable of transmitting a stable high-quality image.

Additionally, the invention has as an object to provide an image server and an image server system capable of transmitting a stable high-quality image rather than an image which gives a visual sense of incongruity when the exposure time has changed.

In order to solve the problems, according to first aspect of the invention, an image server comprises focus position controller for determining a focus position based on a maximum value of focus evaluation detected by picture signal level detector; and a focus lens driver for moving the focus lens in predetermined control volumes based on an instruction from the focus position controller; characterized in that, in case the exposure time is changed to a longer cycle than a predetermined cycle, the focus position controller determines a large control volume corresponding to the change in exposure time and moves the focus lens with the control volume to detect the maximum value of focus evaluation and performs focus control.

In case the exposure time is changed and a long exposure mode is activated where a picture signal is output in a longer cycle than a predetermined cycle, the focus position controller determines the control volume for moving the focus lens depending on the exposure mode which is preferably equal to the control volume in the normal exposure multiplied by the long exposure period/normal exposure period, and thereby promptly detects the maximum value of focus evaluation to determine the focus position based on the maximum value. This ensures pleasant Auto Focus control while requiring a short time in focusing even in the long exposure mode. Moreover, it is possible to maintain high controllability and transmit a stable high-quality image.

According to second aspect of the invention, it is provided a camera apparatus comprising signal level detector for detecting the signal level of a picture signal output from imaging device; and picture signal level controller for adjusting the level of a picture signal output from the imaging device; the camera apparatus performing picture signal processing on and compressing a picture signal output from the picture signal level controller to output image data; characterized in that control level adjuster is provided for determining the correction volume used by the picture signal level controller in level adjustment of a picture signal and that, in case the exposure time of the imaging device is changed to output a picture signal in a longer cycle than a predetermined cycle, the control level adjuster determines the correction volume in accordance with the exposure time and the signal level detected by the signal level detector and the picture signal level controller performs level adjustment of a picture signal by using the correction value.

In case an exposure time is changed and a long exposure mode is activated where a picture signal is output in a longer cycle than a predetermined cycle, it is possible to correct a control value of the picture signal level controller used by the level adjustment means for level adjustment by using a correction value corresponding to the exposure time. This provides control while extending a response time for only a short period and performs adjustment of a signal level in the long exposure mode in nearly the same response time as that in the normal exposure mode. Thus, even when the exposure time has changed, image data is transmitted with no delays. Moreover, it is possible to maintain high controllability and transmit a stable high-quality image even in case a rapid change has taken place in brightness.

Further, according to third aspect of the invention, it is provided an image server connected to a network, the image server outputting shot image data to the network, comprising: picture signal level controller for automatically adjusting the signal level of a picture signal output from imaging device; signal level detector for detecting the signal level of the image signal level-adjusted by the picture signal level controller; image data transmitter for capturing and compressing the picture signal whose signal level is adjusted by the picture signal level controller, converting the picture signal to a predetermined image data format, and transmitting the resulting signal to the network; exposure controller for controlling the exposure time of the imaging device; and transient state controller for controlling the image data transmitter when the exposure time is changed by the exposure controller.

When the exposure time has changed, the image data indicating the signal level of the transient state is transmission-adjusted by the transient state controller. This transmits a stable high-quality image rather than an image which gives a visual sense of incongruity even when the exposure time has rapidly changed.

BRIEF DESCRIPTION OF THE DRAWINGS

FIG. 5A shows a change in Auto Focus evaluation value level and its control value of the image server according to the related art in the normal exposure mode;

FIG. 5B shows the evaluation value level of Auto Focus and its control value of the image server shown in FIG. 5A in the long exposure mode;

DETAILED DESCRIPTION OF THE PREFERRED EMBODIMENTS

First Embodiment

Figure 1:
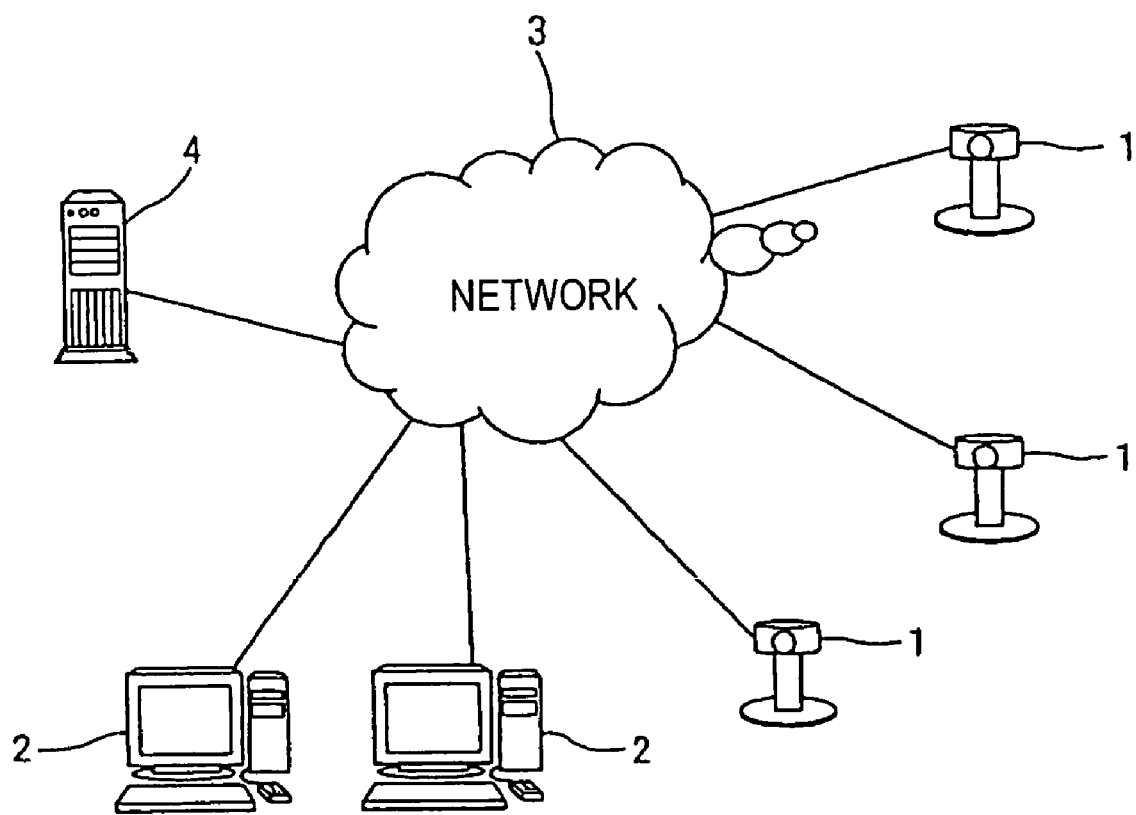
FIG. 1 is a block diagram of an image server and an image server system according to Embodiment 1 of the invention.
Figure 2:
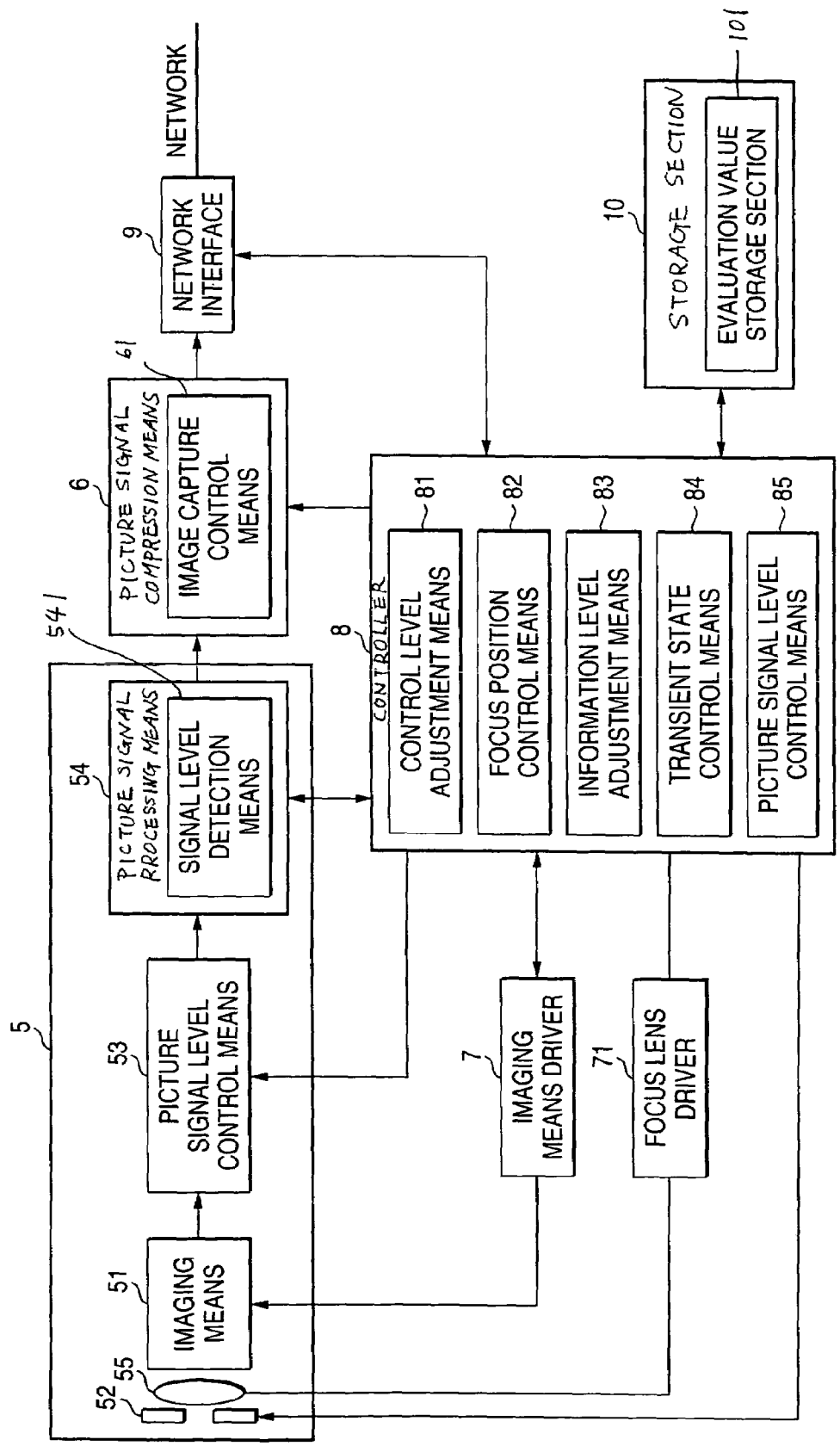
FIG. 2 is a block diagram of the image server according to Embodiment 1 of the invention.

An image server and an image server system according to Embodiment 1 of the invention are described referring to drawings. FIG. 1 is a block diagram of an image server and an image server system according to Embodiment 1 of the invention. FIG. 2 is a block diagram of the image server according to Embodiment 1 of the invention.

In FIG. 1, a numeral 1 represents an image server which photographs a subject and transfers image data, 2 a client terminal such as a PC which is employed by the user to receive and display the image transferred from the image server 1 and which is capable of controlling the image server 1 by way of a camera control signal, and 3 a network such as the Internet which is capable of transferring an image and transmitting a camera control signal. A numeral 4 represents a DNS server which converts a domain name used for access to an IP address. The image server system according to Embodiment 1 comprises an image server 1, a client terminal 2 and a network 3. The client terminal will be described later.

Referring to FIG. 2, a numeral 5 represents a camera provided in the image server 1 for picking up an image of a subject and converting the subject image to an image signal and output the resulting image signal. A numeral 51 represents imaging device comprising imaging elements such as a CCD or CMOS for performing photoelectric conversion of a subject image, and 52 light quantity adjustment means which controls the quantity of light input to the imaging device 51 and which may comprise the shutter feature of the imaging device 51 although mechanical diaphragm is often used.

A numeral 53 represents picture signal level controller which controls the level of a picture signal output from the imaging device 51 and which performs AGC control to optimize the signal level by increasing the gain when the signal level output from the imaging device 51 is decreased. The picture signal level controller 53 is designed to cause a picture signal to follow a target gain value or light quantity value by adjusting the picture signal with an adjustment gain value which will not give a visual sense of incongruity. In case the image of a subject has suddenly turned bright, the image will return to predetermined brightness after a certain period has elapsed. Detection of the signal level of a picture signal is made by calculating the average value of picture signal level for one frame output from the imaging device 5a. Based on the detection result, gain control by the picture signal level controller 53 is made. AGC control is implemented by the signal level detector 5d and the picture signal level controller 53.

The numeral 54 picture signal processor which processes the output signal from the picture signal level controller 53 and generates a luminance signal (Y) and chrominance signals (Cb, Cr), 541 signal level detector which extracts the high-frequency component of the output signal (luminance signal) of the picture signal processor by way of a high-pass filter or an bandpass filter and detects the high-frequency component as a focus evaluation value.

Specific processing made by the picture signal processor 54 includes luminance/chrominance separation, CDS (correlated double sampling), white balance, contour correction and gamma correction. The generated picture signal may be in the form in which the luminance signal and chrominance signal are separate from each other, a form in which these signals are synthesized, or a form of primary colors R, G, B. While the camera 5 is built into the image server 1 in Embodiment 1, the camera 5 may be an external camera separate from the image server 1. A numeral 55 represents a focus lens which can travel to the focus position for AF control.

Detection of the signal level of a picture signal may be made by calculating the average value of picture signal level for one frame output from the imaging device 51. Based on the detection result, gain control by the picture signal level controller 53 is made. AGC control is implemented by the signal level detector 54 and the picture signal level controller 53.

A numeral 6 represents image signal compressor which captures a luminance signal and a chrominance signal input from the camera 5 with a predetermined timing and which compresses/encodes the image signal. The image signal compressor 6 includes an image capture control means for controlling the image capturing. Compression by the image signal compressor 6 is made in a format such as JPEG and MPEG, followed by DCT (Discrete Cosine Transform)

processing, quantization and encoding and a predetermined header is added. The DCT processing performs discrete cosine transform on an image signal in order to represent it in the DCT coefficient as a frequency component. Each DCT coefficient is divided by each coefficient as an element of a quantization table to quantize the coefficient. Encoding converts the quantization coefficient calculated by this quantization to data volume tailored to the frame rate of the network.

A numeral 7 represents an imaging device driver which generates a drive signal for the imaging device 51, 71 a focus lens driver which comprises a motor for moving the focus lens 55. The focus lens driver 51 moves the focus lens in units of a predetermined travel volume up to the focus position. A numeral 8 represents a controller which performs control of the picture signal processor 54, control of the focus lens driver 71 (AF), control of the light quantity adjustment means 52 (AI), and AGC/AWB control. The controller 8 performs control to change the image compression mode as well as generate HTML data and image data in accordance with an instruction transmitted from a browser running on the client terminal 2 via the network 3. By way of a drive mode instructed by the controller 8 the drive signal for the imaging device 51 and the focus lens driver 71 are operated to change the focus.

A numeral 81 represents control level adjuster which performs AGC control when the exposure time is change and the long exposure mode is activated. The AGC control performed by the control level adjuster is basically the same as the operation for normal auto gain control. Note that, in the long exposure mode, separate control from the normal exposure mode is partially made on the correction volume of the set value for the picture signal level controller 53 in accordance with the picture signal level. In case the exposure time is 2V (double the timing period of vertical synchronizing signal), the correction volume of the set value for the picture signal level controller 53 is double the basic correction volume in the normal exposure mode. Thus, the responsivity of AGC control in the long exposure mode is equivalent to that in the normal exposure mode.

A numeral 82 represents focus position controller which records per exposure time as an evaluation value the high-frequency component of a luminance signal detected by the signal level detector 541 in AF control and which calculates the evaluation value change ratio mentioned later to determine that the evaluation value has become a maximum value. The focus position controller 82 issues a travel instruction per change in exposure time to the focus lens driver 71 to cause the focus lens driver 71 to move the focus lens 55 in predetermined travel volumes and sets the position where focus is achieved as a focus position. The evaluation value per exposure time is stored into the evaluation value storage section 101 of the storage section mentioned later.

A numeral 83 represents control level adjuster for performing AGC control when the exposure time is changed and the long exposure mode is activated. AGC control by the control level adjuster 83 is basically as that under (1) through (5) described below although calculation of a correction volume for the picture signal level controller 53 is partially different from that in the normal exposure mode as mentioned later.

Specific operation of AGC control is described below. First, (1) the signal level detector 54 calculates the average value of the level of a picture signal concerning the brightness for one frame output from the imaging device 51. The "picture signal output from the imaging device 5" refers to a signal level-adjusted by the picture signal level controller 53. Next, (2) the signal level detector 54 communicates the average value of the detected picture signal level to the camera controller 8. Next, (3) the controller 8 compares the picture signal level communicated from the signal level detector 54 with a preset reference level and calculates the difference between the two. Next, (4) the controller 8 uses a preset reference table or function for AGC control to calculate the correction volume for the picture signal level controller 53. Next, (5) the control means 8 communicates the calculated correction volume to the picture signal level controller 53. Then, (6) the picture signal level controller 53 changes the gain of the amplifier (that is, adds the gain correction volume to the preset gain of the amplifier to re-set the gain of the amplifier) based on the gain correction volume communicated from the camera controller 8, thereby adjusting the picture signal output from the imaging device 51. This is the end of AGC control procedure. In order to detect a picture signal level per frame and perform AGC control, acquisition and adjustment of picture signal level is performed in a period equivalent to the cycle where a picture signal is output.

The reference level refers to the level of a target picture signal to be automatically adjusted by way of AGC control, and is for example the level of a picture signal where the average value of a picture signal for one frame is equal to the brightness of 50%. The reference level is set to a visually appropriate value but may be changed by way of operation outside the network.

A numeral 84 represents transient state controller for determining that the image signal level has settled in a predetermined reference range based on the image signal level detected by the signal level detector 541 and performing the initial image processing after the change in exposure time to restart compression and transmission of image data when the exposure time is changed and the long exposure mode is activated. A numeral 85 represents picture signal level controller for controlling the light quantity adjustment means 52 and the picture signal level adjustment means 53 based on the picture signal level obtained from the picture signal processing circuit and the change in exposure mode.

A numeral 9 represents a network interface connecting the server 1 and the network 3. The network interface 3 transmits an instruction from the browser to the camera 5 as well as transmits HTML data and image data from the image server 1 to the network 3. A numeral 10 represents a storage section used by a CPU of the controller 8 to read a program or data. A numeral 101 represents an evaluation value storage section which stores the evaluation value per exposure time in order to detect the maximum value of evaluation in AF control. The evaluation value storage section 101 also stores the calculated evaluation value change ratio each time the focus lens driver 71 moves the focus lens.

Figure 3:
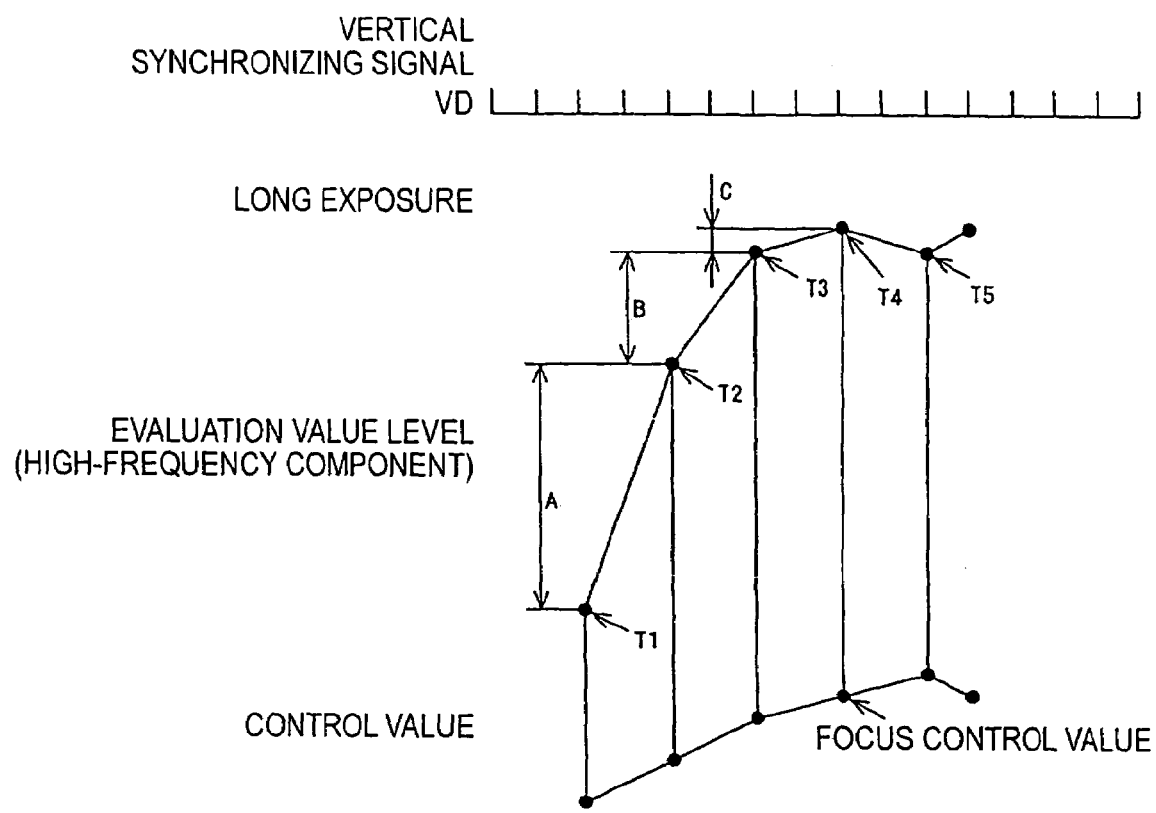
FIG. 3 illustrates the evaluation levels and its control values in Auto Focus control of the image server according to Embodiment 1 of the invention in the long exposure mode.

The image server 1 in Embodiment 1 executes AF control when the normal exposure mode is switched to the long exposure mode. A change in Auto Focus evaluation value on mode change and its control value are described below. FIG. 3 illustrates the evaluation levels and its control values in Auto Focus control of the image server according to Embodiment 1 of the invention in the long exposure mode. FIG. 5A shows a change in Auto Focus evaluation value level and its control value applicable to also the image server according to Embodiment 1 in the normal exposure mode, which is referenced herein.

Figure 4:
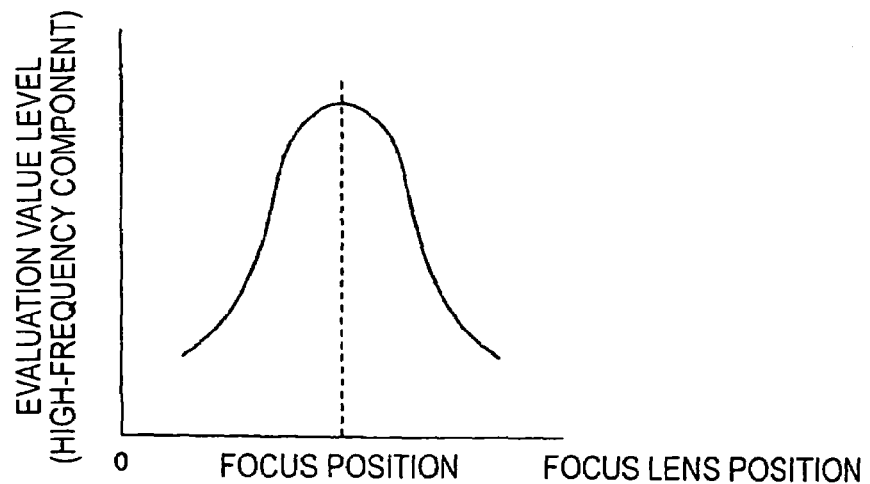
FIG. 4 illustrates the principle of related art Auto Focus control.

As shown in FIG. 5A, the focus position controller 8b moves the focus lens in accordance with the control value in order to detect a focus position in the normal exposure mode in AF control. A travel instruction is issued per 1V period of the normal exposure time (timing duration of vertical synchronizing signal) and the focus lens travels in equal distances in the direction where the level of the focus evaluation value rises. This is to execute hill-climbing servo as shown in FIG. 4. The focus position controller 8*b* detects a focus evaluation value for each travel and calculates a ratio of the detected focus evaluation value to the evaluation value last detected. The ratio is the evaluation value change ratio which shows a change in the gradient of an evaluation value. By way of example, in FIG. 5A, the change volume is A and B respectively for a period from time point T1 to time point T2 and a period from time point T2 to time point T3, so that the evaluation value change ratio is B/A. Similarly, the evaluation value change ratio is C/B for a period from time point T2 to time point T3 and a period from time point T3 to time point T4, and D/C for a period from time point T4 to time point T5 and a period from time point T5 to time point T6, and E/D, E/F, etc. A change in gradient is the difference between times. The travel volume is fixed so that the evaluation change ratio shows a change in gradient. The focus position controller 8*b* calculates the evaluation value change ratio and stores it into the evaluation value storage section 10*a*.

In this way, the focus evaluation value increases with the elapse of time, that is, a change in evaluation value (travel of focus lens) and is peaked at time point T6, then decreases again at time point T7. This is determined that the evaluation value level and the evaluation value change ratio have switched from positive to negative. The focus evaluation value reaches a maximum value at time point T6 and then decreases again. It is thus understood that the control value immediately preceding the time point where the focus evaluation value decreases is the focus control value. The focus position controller 8*b* sets this value as the focus position of the focus lens.

In the long exposure mode, in the 2V period (double the (timing duration of vertical synchronizing signal) from time point T1 to time point T2, double exposure of normal exposure mode is provided so that the length of a cycle where a focus evaluation value is obtained is doubled, as shown in FIG. 3. The length of a cycle where the focus lens travels is also doubled. Thus the focus lens is made to travel with the control volume double that in the normal exposure mode. To be more precise, a control volume obtained by multiplying the control volume in the normal exposure mode by [long exposure period/normal exposure period] is preferable. The resulting travel volume per 1V is the same. Similar to the normal exposure mode, the change volume A between the evaluation value level at time point T1 and that at time point T2 is stored. Next, in the 2V period from time point T2 to time point T3, the focus lens is made to travel with the same control volume for the period from time point T1 to time point T2. The change volume B between the evaluation value level at time point T2 and that at time point T3 is obtained. The change volume B is compared with the change volume A and the ratio of the change volume B to the change volume A, that is, the evaluation value change ratio B/A is calculated.

The above calculation is continued. In case the evaluation value change ratio B/A has dropped below a predetermined value such as 0.05, it is understood that the evaluation value level is neat a maximum value. The focus position controller 8*b* preferably reduces the control volume at the next time point. For example, the focus position controller 8*b* should return to the control volume for 1V in the normal exposure.

Detailed calculation is continued in this state, same as the control in normal exposure. The evaluation value decreases from time point T4 to time point T5 as shown in FIG. 3. The focus position controller 8*b* then determines the control value at time point T4 as the focus position. At the same time, the focus position controller 8*b* sets the focus position of the focus lens with the 1V period. This control reduces time to focusing even in the double exposure. In case the evaluation value change ratio B/A is not below the predetermined value such as 0.05 and the evaluation value change ratio B/A is reversed to negative, the maximum value of the evaluation value level is detected at time point T2. In this case, a focus position is located near the focus lens position at time point T2 so that control is made to return the focus lens position to approach that at time point T2 to determine the focus lens position where the evaluation value level is at its maximum. In this procedure also, the focus position controller 8*b* makes control while performing detailed calculation, same as in the normal exposure mode, so as to determine as a focus position the control value at time point T4*b* where the evaluation value decreases.

In this way, the image server and the image server system according to Embodiment 1 can perform pleasant Auto Focus control with quick focusing even in the long exposure mode. It is possible to perform AF control for equivalent time period and maintain high controllability as well as transmit a stable high-quality image. In particular, the image server is effective as an image server comprising a camera which calculates the evaluation value of Auto Focus control per frame.

According to the embodiment as mentioned above, in case the exposure time is changed and a long exposure mode is activated where a picture signal is output in a longer cycle than a predetermined cycle, the focus position controller determines the control volume for moving the focus lens depending on the exposure mode which is preferably equal to the control volume in the normal exposure multiplied by the long exposure period/normal exposure period, and thereby promptly detects the maximum value of focus evaluation to determine the focus position based on the maximum value. This ensures pleasant Auto Focus control while requiring a short time in focusing even in the long exposure mode. Moreover, it is possible to maintain high controllability and transmit a stable high-quality image.

Calculation for determining the focus position is made easy.

It is possible to detect a precise position when the maximum value is detected.

The ratio of change in focus evaluation value is minutely measured so that it is possible to detect a precise position when the maximum value is detected.

It is readily possible to detect a focus position from the picture signal obtained from the imaging device.

Image data is transmitted with no delays despite a change in exposure time. It is possible to obtain a stable high-quality image even in case a rapid change has taken place in brightness.

Second Embodiment

The image server 1 according to Embodiment executes level adjustment control when the system is switched from the normal exposure mode to long exposure mode. The signal level and its correction volume in mode change are described below. Same signs as those of the image server of Embodiment 1 shown in FIGS. 1 and 2 show the same components so that the details will be omitted.

Figure 6:
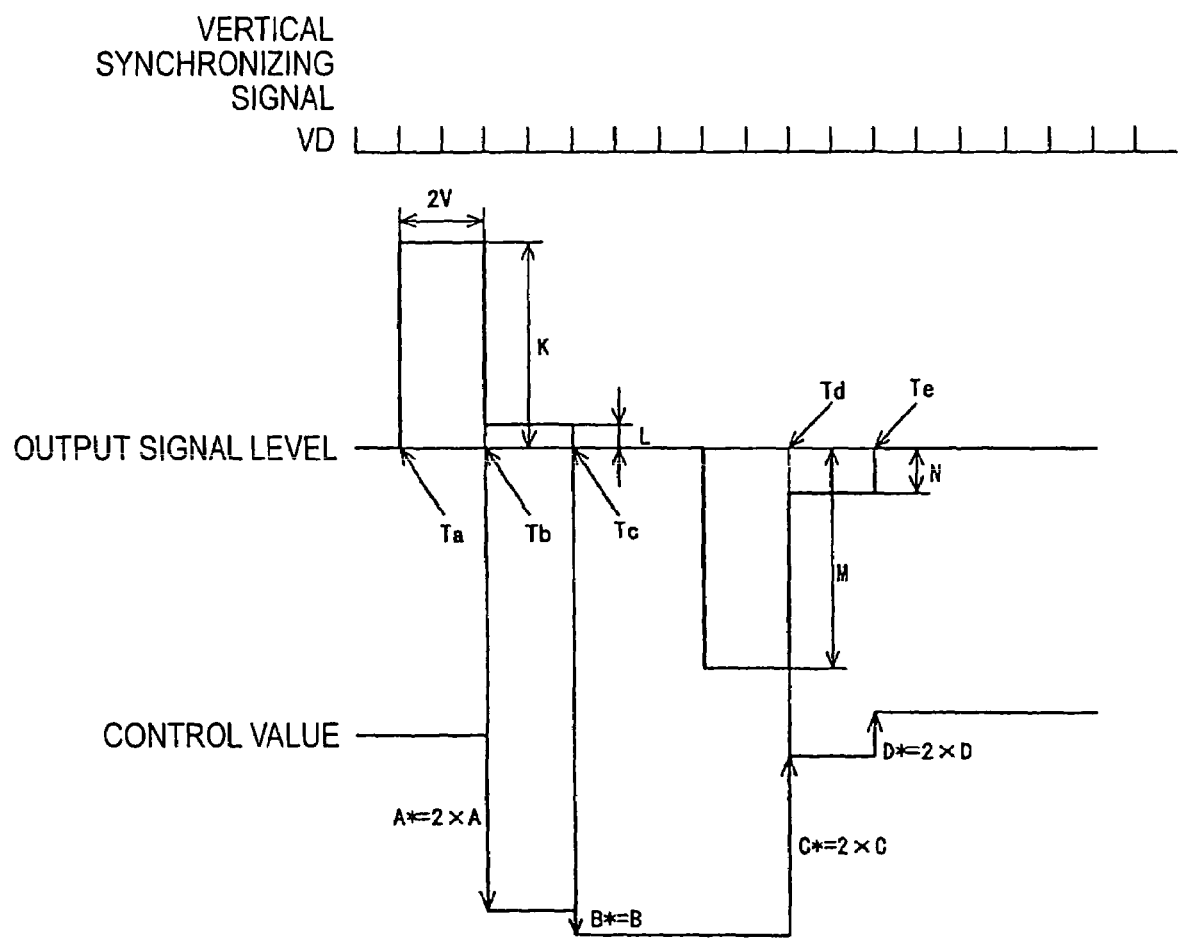
FIG. 6 illustrates the output signal level and its correction volume of the image server according to Embodiment 2 of the invention in the long exposure mode.
Figure 9:
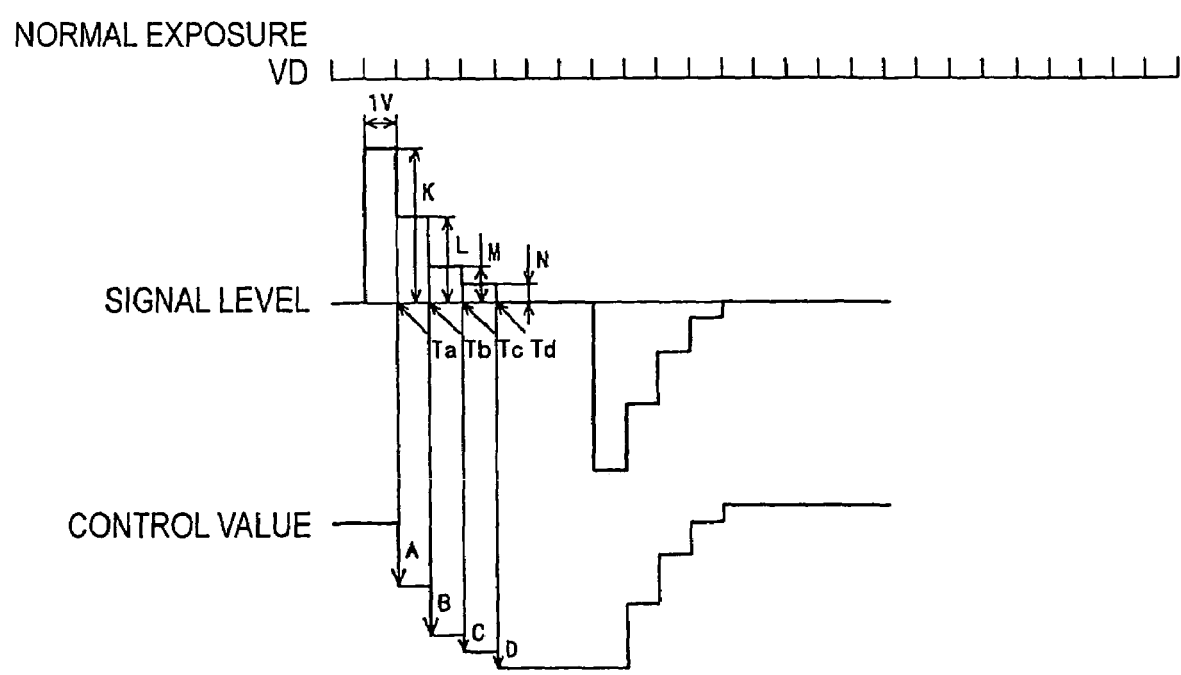
FIG. 9 shows the output signal level and its control value of the image server in the normal exposure mode.

FIG. 6 illustrates the output signal level and its correction volume of the image server in the long exposure mode according to Embodiment 2 of the invention. FIG. 9 shows the output signal level and its control value of the image server according to the invention in the normal exposure mode.

FIG. 9 is an explanatory drawing which shows the level of a signal output in a normal exposure mode of a related image server and its control value. In FIG. 9, the signal level of 1V period exposure is detected at the time point Ta. Note that 1V is the timing of a vertical synchronizing signal. The difference K between a signal level and a reference level and an exposure time are used to obtain the correction volume A for AGC, AE and AWB in exposure. In accordance with a change in the correction volume A, the control value for each control is changed. After the next V period, correction values B, C, D are obtained and sequentially specified in accordance with the differences L, M, L between signal levels and the reference level, and the signal level is finally changed into a reference level. The correction volumes A, B, C, D are determined so that the brightness will change gradually by way of AGC control in consideration of a response speed and a change in the brightness of an image on the screen, in order to follow a rapid change in brightness and secure stability.

In the long exposure time of Embodiment 2, the signal level of 2V-period exposure is detected with the signal level detector 541 at a time point Tb as shown in FIG. 6. Note that 1 V is a timing of a vertical synchronizing signal. The signal level detector 541 communicates the detection result to the controller 8. The controller 8 determines that the exposure mode is the long exposure mode and starts AGC control by way of the control level adjuster 83. The control level adjuster 83 compares the picture signal level communicated from the signal level detector 54 with a preset reference level and calculates the difference between the two. Next, the control level adjuster 83 calculates a gain correction volume A* by using a preset AGC reference table or function from the difference K and the exposure time 2V. Operation of calculation of the correction volume A*, using the reference table is described below referring to Table 1.

TABLE 1

| Level difference X | Basic correction volume Y |
| --- | --- |
| 1 | 1 |
| 5 | 1 |
| 10 | 3 |
| 30 | 5 |
| 60 | 8 |
| 100 | 14 |
| 150 | 20 |
| 200 | 30 |
| 300 | 50 |

Table 1 which shows the basic correction volume for the level difference X is stored in the storage means 10. While not shown, a value in the reference table assumed in case the level difference X is a negative value is one preceded by a minus sign (−) in a value in Table 1. For example, in case the calculated level difference X is 200, the basic correction volume is 30. The exposure time is 2V (double exposure unit time) so that the calculated correction volume is twofold. The correction volume is obtained using the expression: A*=(basic correction volume Y corresponding to the level difference X)×(unit time count P)=30×2=60.

Next, the method for calculating a gain correction volume by using a function is described below. A correction volume obtained by arithmetic operation is calculated based on an arithmetic expression whose variables are the difference X between the signal level and the reference level and the exposure time.

As an arithmetic expression, the arithmetic expression: Gain correction volume=$X \times Log(X^2) \times P \times a$, where $P^*=\sqrt{P}$ and a=0.05. In case each variable is X=100, P=2 (unit exposure time), the correction volume=100×4×1.4× 0.05=28. Table 2 shows the arithmetic operation result obtained in case P=2.

TABLE 2

| Level difference X | Correction volume $X \times Log(X^2) \times \sqrt{P} \times 0.05$ |
| --- | --- |
| 1 | 0 |
| 5 | 0.49 |
| 10 | 1.41 |
| 30 | 6.24 |
| 60 | 15.04 |
| 100 | 28.2 |
| 150 | 46.02 |
| 200 | 64.88 |
| 300 | 84.52 |

By using such an arithmetic expression, the need for using a reference table is eliminated so that it is no longer necessary to reserve a storage area for a reference table. Thus, in case an arithmetic expression can be used, the arithmetic expression can be used to obtain a correction volume.

The arithmetic expression in Table 2 above has X and P as variables. It is of course possible to provide an arithmetic expression using X as a variable per value of P, that is, exposure time. By doing so, the structure of the arithmetic expression is made simpler by using P as an additional variable, which facilitates use of an arithmetic expression.

By also considering the change ratio W of a picture signal output from the imaging device 51, it is possible to higher-precision picture signal level control. For example, the difference between the level of a picture signal output from the imaging device 52 in the 2V period of Ta through Tb (hereinafter referred to as the "ab" period) and the reference level is K, which is used to obtain the correction volume A*. The difference between the picture signal level in the 2V period of Tb through Tc (hereinafter referred to as the "bc" period) obtained from the control value corrected with the correction value A* and the reference level is L. Thu, the change ratio is represented in the expression: W=(L−L)/A*. In case the difference between the product of the correction volume B* obtained from the difference L between the picture signal level and the reference level at the time point Tc and W (expected signal level change volume) between L, that is L−B*×W is a negative value, correcting a control value by using the correction volume B* is expected to result in the picture signal level smaller than the reference level, so that the correction volume B* obtained is replaced with B*×W. In case B*×W is a positive value, the correction volume B* is used.

In this way, by adding the change ratio W of the picture signal output from the imaging device 51, it is possible to perform more precise picture signal level control.

The correction volume A* thus calculated is communicated from the control level adjuster 83 to the picture signal level controller 53, which changes the amplifier gain of the picture signal level controller 53 based on the correction volume communicated from the controller 8 and adjust the picture signal output from the imaging device 51. What is necessary is to be able to obtain a proper correction volume corresponding to the exposure time. For example, the basic gain correction volume corresponding to level X may be multiplied by 1.7 for the double exposure time or 2.2 for the triple exposure time, without simply being multiplied by the number of exposure time units.

The correction volumes B:, C:, D* per 2V exposure time (Tc, Td, Te) are calculated with the same calculation method. In case the level difference X is between values in Table 1, X is complimented by another level difference in the reference table. For example, in case the level difference X is 20, the basic correction volume=3+(5−3)×(20−10)/(30−10)=4.

While the reference table (Table 1) includes some of the revel differences X and other level differences are complimented to obtain correction volumes, the reference table may be created to cover all level differences for calculation of correction values in case sufficient memory is available.

As mentioned above, the AGC control count per unit time is smaller in the long exposure mode than in the normal exposure mode. The picture signal level controller 53 adjusts the signal level of a picture signal with the correction volume corresponding to the exposure time so that the response time is not extended P-fold (unit exposure time count) with respect to the normal exposure time but the correction volume changes in accordance with the ratio of exposure time×long exposure time. This ensures signal level adjustment in an equivalent time (equal time or a little longer time) to that in the normal exposure time. This allows the picture signal level controller 5a to change the gain and follow the signal level in the same procedure as in the normal exposure mode.

When the normal exposure mode is switched to the long exposure mode, the picture signal level detected by the signal level detector 5d rapidly changes. The signal level is made stable near the reference value by way of AGC control. Thus, in calculation of a correction volume after the signal level has settled near the reference value or after a predetermined time has elapsed, calculation procedure may be done similarly to the normal exposure mode without multiplying the exposure P.

For the same exposure time, a value corresponding to the level difference X may be preset and the basic correction volume Y may be multiplied by the value. This value is preset in a reference table or calculated by using an arithmetic expression whose variables are X and P.

For the exposure time 2V, a level difference X smaller than or equal to 10 may be set to a multiplication value of 1, a level difference X larger than 10 to smaller or equal to 30 a multiplication value of 1.5, and a level difference X larger than 30 a multiplication value of 2. In this case, when X=10, a correction volume of 3 is obtained from the multiplication value of 1 corresponding to Y=3 and the exposure time. When X=30, a correction volume of 7.5 is obtained from the multiplication value of 1.5 corresponding to Y=3 and the exposure time. When X=200, a correction volume of 60 is obtained from the multiplication value of 2 corresponding to Y=30 and the exposure time. By doing so, it is possible, when the exposure time is prolonged, to set the AGC response time close to that in the normal exposure mode as well as perform proper AGC control which is tailored to the taste of a person browsing an image from the image server. In particular, in case the exposure time is considerably long, such as 10-fold, this procedure can prevent possible overshooting of the reference level caused by simple multiplication of X by P.

While the basic correction volume Y is multiplied by the ratio P of functions of exposure time to obtain the correction volume in exposure in this example, an arithmetic expression whose variables are Y and P may be used instead.

In this way, the image server and the image server system do not show a response time P times as long as that in the normal exposure mode even when the normal exposure mode is switched to the long exposure mode. The correction volume changes in accordance with the ratio of exposure time P×long exposure time, thereby allowing signal level adjustment in an equivalent time (equal time or a little longer time) to that in the normal exposure time. This allows the picture signal level controller 53 to change the gain and follow the signal level in the same procedure as in the normal exposure mode. When the signal level is below the predetermined range, adjustment is possible in accordance with the change ratio for adjustment in the normal exposure mode, which prevents overshooting of the reference level. While the picture signal level controller 53 is used to adjust the picture signal level in this example, light quantity adjustment means 54 may be used instead of the picture signal level controller 53.

Embodiment 3

Figure 7:
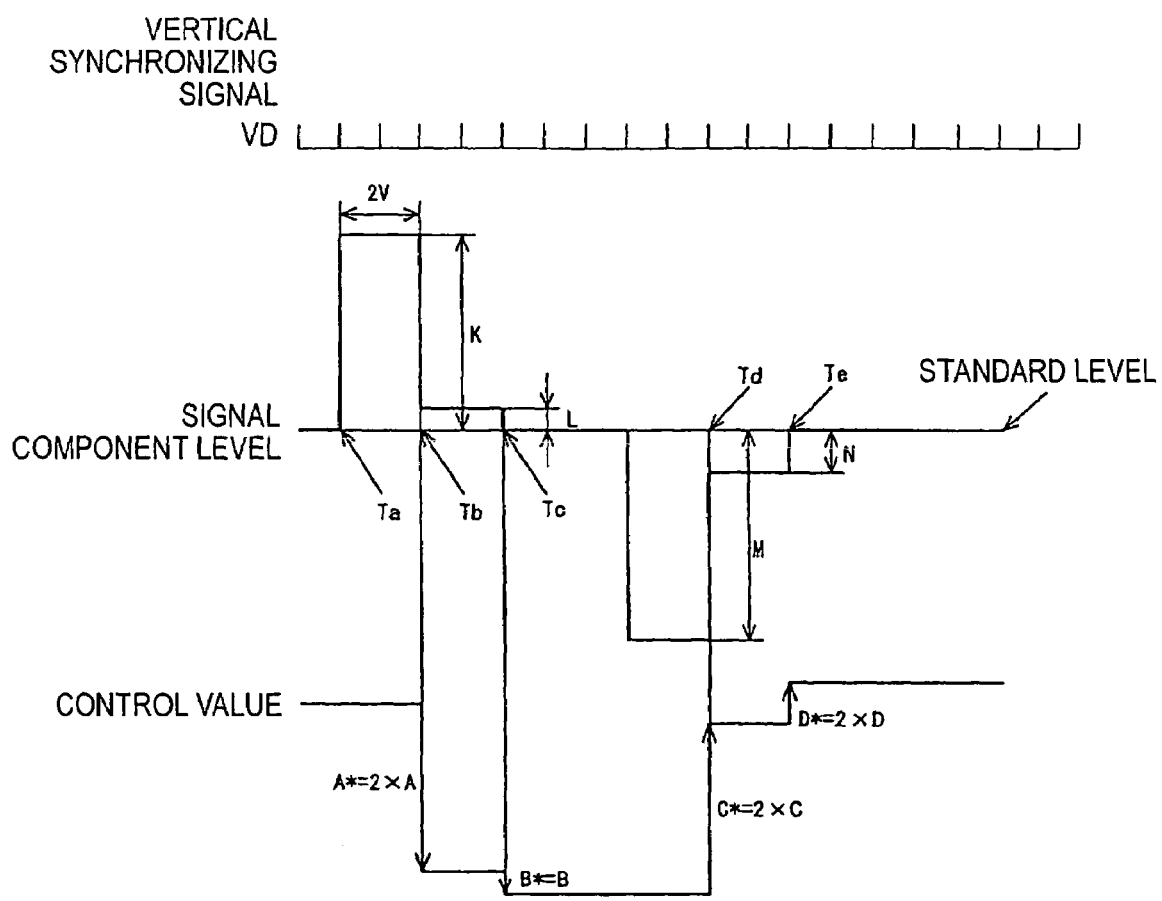
FIG. 7 illustrates the signal component levels and its control values in the white balance control of the image server according to Embodiment 3 of the invention.

An image server according to Embodiment 3 of the invention concerns white balance control. FIG. 7 illustrates the signal component levels and its control values in the white balance control of the image server according to Embodiment 3 of the invention.

The basic operation of the white balance control is described below. When the imaging device 51 outputs an R signal component, G signal component and B signal component, the picture signal processor 54 amplifies or attenuates the R signal component and the B signal component to control the components to the same level as the G signal component. In case a complementary signal is output from the imaging device 51, the R signal component, G signal component and B signal component are generated by way of arithmetic operation and the R signal component and B signal component are amplified or attenuated to control the components to the same level as the G signal component. Note that, in some cases, the R signal component and B signal component are controlled so that each of them will maintain a predetermined level difference from the G signal component. For example, the signal component level is the R signal component level or B signal component level and the reference level is a value having a predetermined level difference from the G signal component level. To be more precise, depending on an image, both R signal component and B signal component is given a desired weight with respect to the G signal component in order to set a level target value. The target value may change from moment to moment with a change concerning the subject or a change in color temperature.

The while balance control at switchover from normal exposure mode to long exposure mode in Embodiment 3 is substantially the same as that in Embodiment 2 except that the signal level is replaced with the signal component level processed by the picture signal processor 54. Thus, the details are omitted and the operation will be outlined below.

Figure 8:
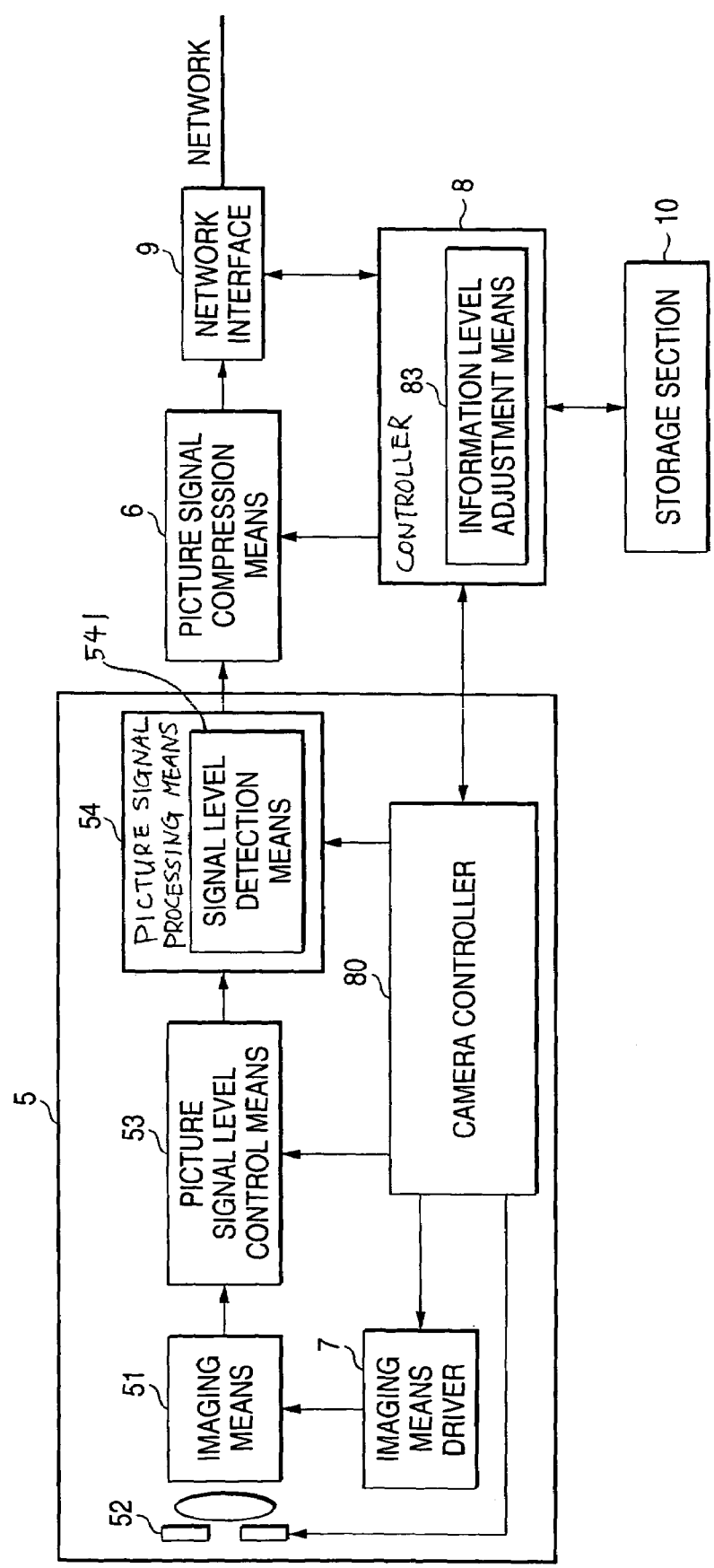
FIG. 8 is a block diagram of the image server according to Embodiment 4 of the invention.

Referring to FIG. 8, at a time point Tb, the signal level detector 5d1 detects the signal component level under exposure of 2V period. The signal level detector 541 in Embodiment 3 performs level detection of R signal component and B signal component. The signal level detector 541 communicates the detection result to the camera controller 8. From the difference K between the signal component level and the reference level and the exposure time, the control level adjuster 8a in Embodiment 4 obtains the correction volume A* in exposure. The correction volume is calculated in the same procedure as that in Embodiment 2. Note that the correction volume to be calculated is used to correct the picture signal level concerning color, not picture signal level concerning brightness.

The correction volume A* thus calculated is communicated from the control level adjuster 8a to the picture signal level controller 53, which changes the chrominance signal component level adjustment value of the picture signal level controller 53 to adjust the picture signal output from the imaging device 5a based on the correction volume communicated from the camera controller 8.

The correction volumes B*, C: D per 2V exposure time (Tc, Td, Te) are calculated by using the same calculation method.

In this way, the image server and the image server system according to Embodiment 3 do not show a response time P times as long as that in the normal exposure mode even when the normal exposure mode is switched to the long exposure mode. The control correction volume changes in accordance with exposure time, thereby allowing signal level adjustment in the same time as that in the normal exposure time. This allows the picture signal processor 53 to change the gain and follow the signal level in the same procedure as in the normal exposure mode and control the white balance.

Embodiment 4

Embodiment 4 of the invention is an image server of Embodiment 1 except that a built-in server is omitted. FIG. 8 shows the block diagram of an image server according to Embodiment 4 of the invention. Same signs as those of the image server of Embodiment 1 shown in FIGS. 1 and 2 show the same components so that the details will be omitted.

Referring to FIG. 8, a numeral 80 represents a camera controller for controlling a camera 5 separate from the image server which photographs a subject and outputs an image signal. The camera controller 80 drives the imaging device 5a of the camera 5, controls the picture signal processor 5d, controls the light quantity adjustment means 52 (AE) and performs AGC/AWB control at specific levels.

The controller 8 performs control to change the image compression mode and generate HTML data and image data in accordance with an instruction by the browser running on the client terminal 2 transmitted from the network 3 via the network interface 9. In order to perform signal level adjustment in the same way as the adjustment made for a predetermined cycle, and in order to compress an image signal and transmit image data in the same cycle as the image signal, the controller 8 and the control level adjuster 83 instruct the camera controller 80 to control the imaging device 51, picture signal processor 54, light quantity adjustment means 52, and perform AGC/AWB control.

In this way the image server does not have a built-in camera 5 and may have an external camera. Thus various image servers may be provided through combination with the camera 5, which assures convenience.

While the image server has been described in Embodiments, the invention is not limited thereto but any other imaging apparatus performing AGC control and AWB control maybe employed instead.

In case an exposure time is changed and a long exposure mode is activated where a picture signal is output in a longer cycle than a predetermined cycle, it is possible to correct a control value of the picture signal level controller used by the level adjustment means for level adjustment by using a correction value corresponding to the exposure time. This provides control while extending a response time for only a short period and performs adjustment of a signal level in the long exposure mode in nearly the same response time as that in the normal exposure mode. Thus, even when the exposure time has changed, image data is transmitted with no delays. Moreover, it is possible to maintain high controllability and transmit a stable high-quality image even in case a rapid change has taken place in brightness.

According to the embodiments as mentioned above, it is possible to perform appropriate level adjustment in accordance with the exposure time even after the normal exposure mode is switched to the long exposure mode.

The level adjustment means uses a preset reference table or function so that calculation of a correction value based on the exposure time and signal level is made easy. The control value of the picture signal level controller is adjusted by using the level correction value so that it is possible to perform proper AGC control and AWB control in accordance with the exposure time. This performs adjustment of a signal level in the long exposure mode in a short period.

The correction value is calculated based on the exposure time, picture signal level and ratio of change in picture signal level, which allows high-precision level adjustment.

As the signal level approaches the reference level. The correction value decreases, which prevents excessive control. The user does not feel a sense of incongruity about the image.

It is thus possible to perform proper AGC control in accordance with the exposure time.

It is thus possible to perform proper AWB control in accordance with the exposure time.

It is thus possible to provide an image server system capable of performing proper picture signal adjustment in accordance with the exposure time.

It is thus possible to provide an image server system capable of performing proper picture signal adjustment in accordance with the exposure time.

Embodiment 5

Control of image data transmission is described below which takes place when the image server 1 of the Embodiment is switched from the normal exposure mode to the long exposure mode.

Figure 10:
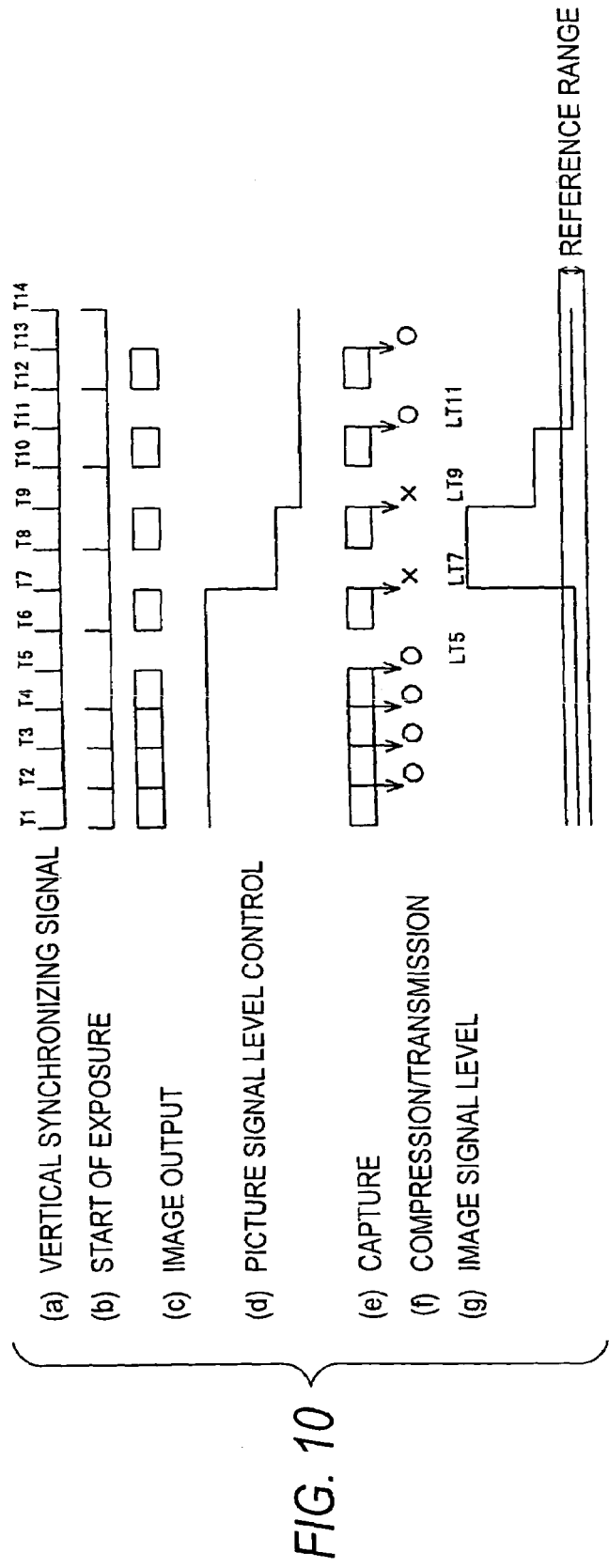
FIG. 10 illustrates the output signal level and its data transmission of the image server according to Embodiment 5 of the invention in the long exposure mode.

FIG. 10 illustrates the signal level output from the image server according to the invention in the long exposure mode and the corresponding data transmission.

T1 through T14 shown in part (a) are vertical synchronizing timings as a reference for operation of an image server. As an alternative, a timing generated by separately provided timing signal generation means may be used for control. Part (b) shows the exposure start timing and T1 through T4 correspond to the normal exposure mode. The exposure start timing basically matches the picture signal read timing from the imaging device 51. At T5, readout of a picture signal (Image Read) from the imaging device 51 is halted and the long exposure mode having the exposure time double that of the normal exposure mode is selected (in the following procedure, readout of a picture signal is made with every other timing of the vertical synchronizing signal, etc.). In this case, the picture signal from the imaging device 5a is read with the timing T6, as shown in part (c).

In part (e), at time points T1 through T4, the picture signal in the normal exposure mode is captured by the image capture control means 61 and compressed and transmitted with the timings of T2 through T5 as shown in part (f). The signal level of the picture signal captured in a period T6 through T7 is based on the long exposure mode. The exposure time is longer than in the normal exposure mode, so that the signal level detected by the signal level detector 541 is high as shown at T7 in part (g). The picture signal level adjustment means 53 performs level adjustment so as to decrease the gain of the signal level of the picture signal captured after T8, based on the signal level detected by the signal level detector 541. With the timing T1, the picture signal level in the long exposure settles at a predetermined level.

In the period from time points T5 through T11, the picture signal level is high as shown in part (g). Compressing the picture signal without level adjustment and transmitting the compressed signal will result in output of a picture signal of an irregular level caused by a rapid increase in the picture signal level, which gives a sense f incongruity. This is why the picture quality is degraded on the related art image server in switchover between exposure modes.

In Embodiment, once switchover has taken place between exposure modes, while the picture signal level is detected by the signal level detector 541 and it is determined that the signal level is out of the reference range by the transient state controller 84, compression/transmission of the picture signal is halted. The transient state controller 84 may be provided with timing signal generation means and the timing signal may be generated or halted in order to control compression/transmission of a picture signal. Thereafter, based on an instruction from the picture signal level controller 85, the picture signal level adjustment means 53 performs AGC control. When the transient state controller 84 determines that the signal level is within the reference range, compression/transmission of a picture signal is restarted.

Control operation of the image server according to the Embodiment is described below.

Figure 11:
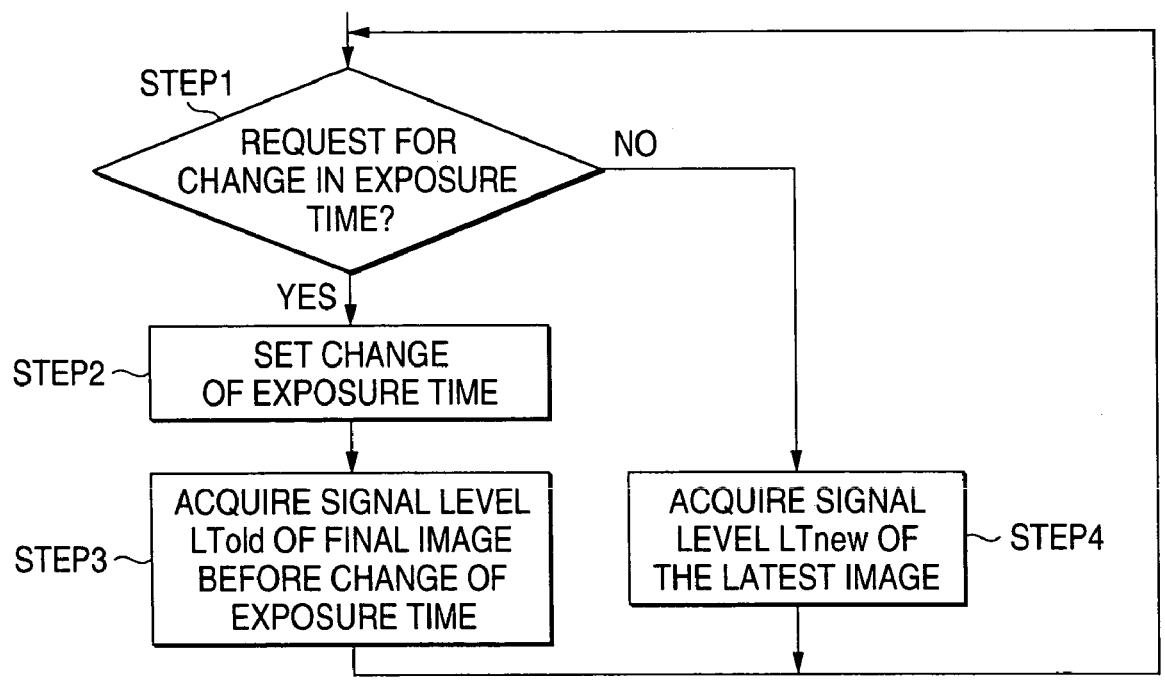
FIG. 11 is a flowchart of the exposure control operation of the camera according to Embodiment 5 of the invention.
Figure 12:
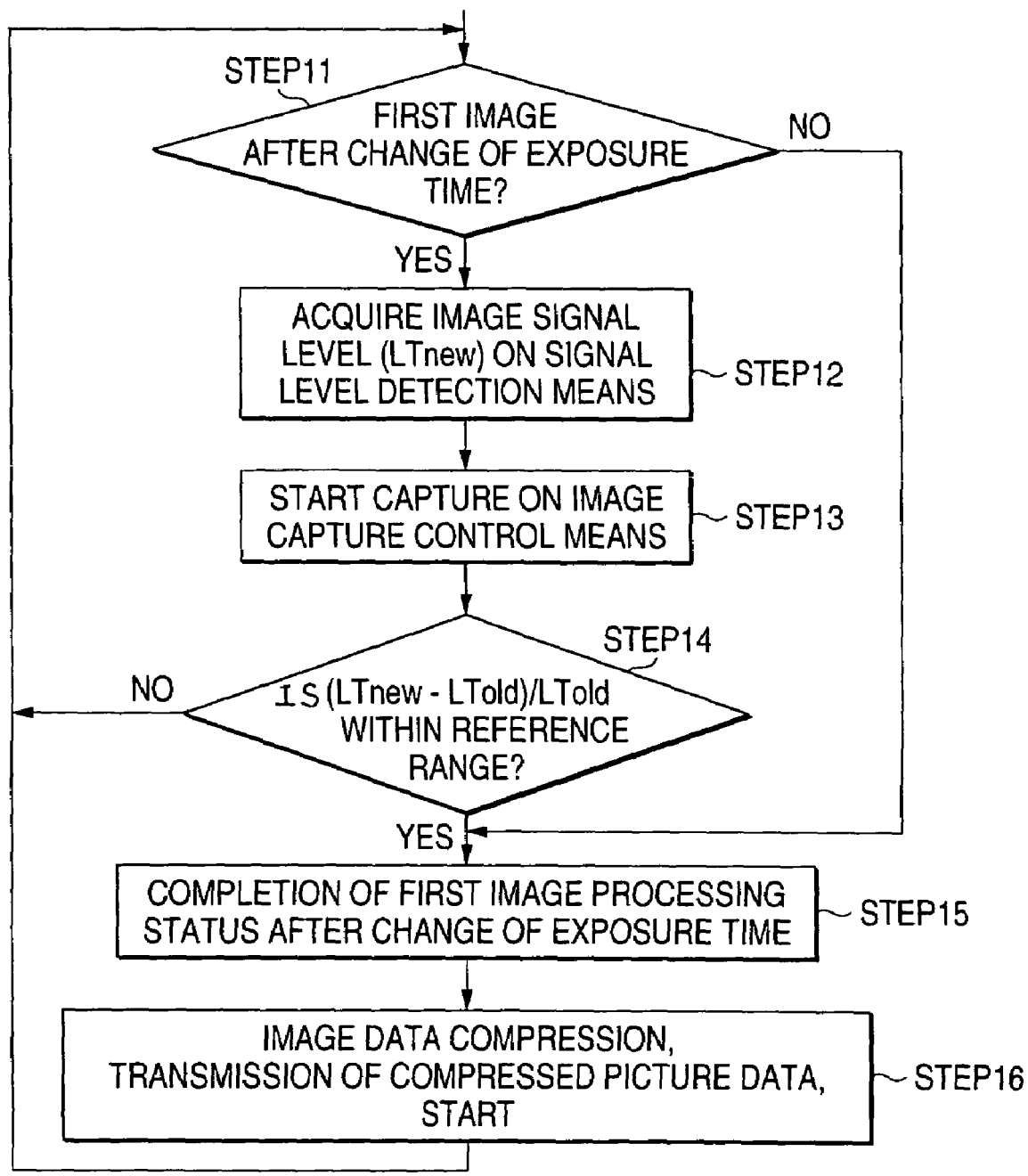
FIG. 12 is a flowchart of control operation of compression/transmission based on the signal level determination by the image server according to Embodiment 5 of the invention.
Figure 13:
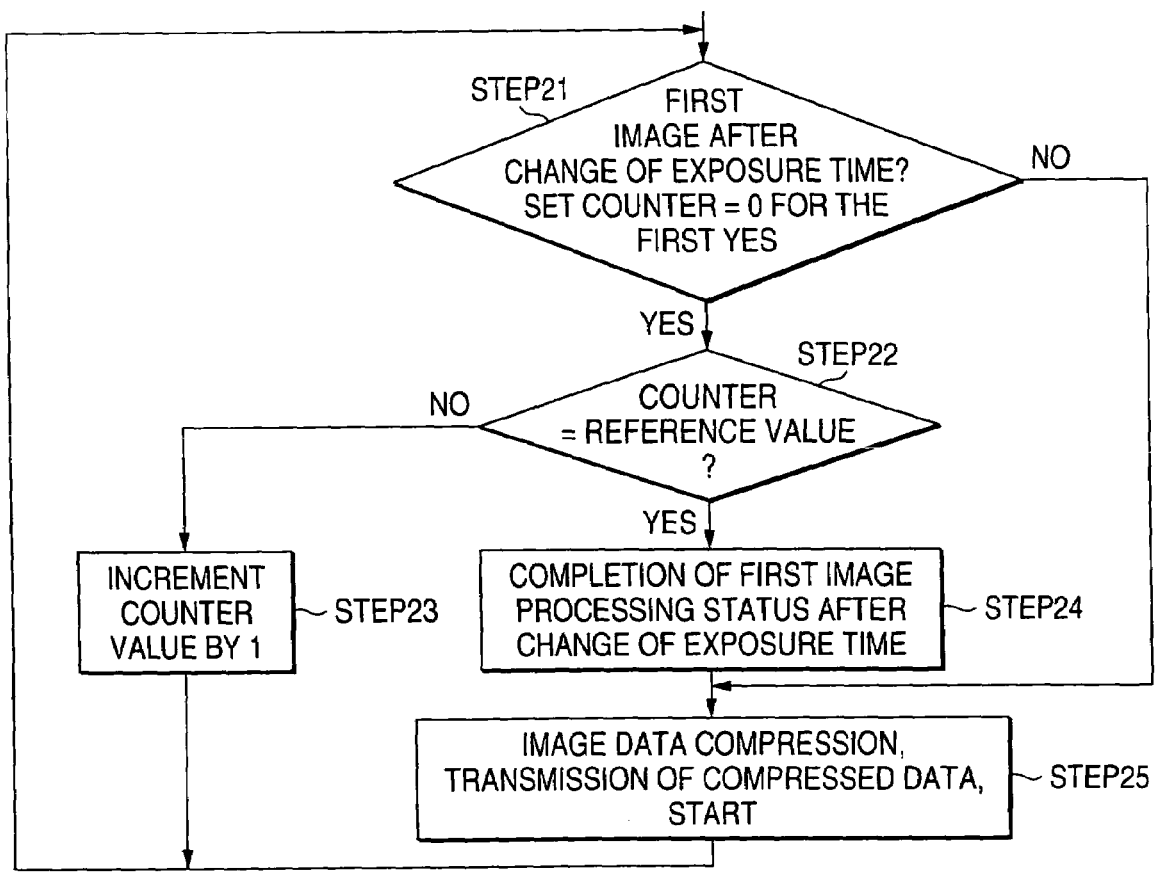
FIG. 13 is a flowchart of compression/transmission by using the counter of the image server according to Embodiment 5 of the invention.

FIG. 11 is a flowchart of the exposure control operation of the camera according to Embodiment 5 of the invention. FIG. 12 is a flowchart of control operation of compression/transmission based on the signal level determination by the image server according to Embodiment 5 of the invention. FIG. 13 is a flowchart of compression/transmission by using the counter of the image server according to Embodiment 5 of the invention.

Exposure control operation of the camera 5 is described below referring to FIG. 14. The controller 8 checks whether a request for change of exposure time has been issued to the image server in the standby state from the network (step 1). In case the request has been issued, the controller 8 sets the change of exposure time (step 2) to adjust the exposure time. The camera 5 acquires the signal level L Told of the final image before the change of exposure time (step 3) and outputs it to the controller 8 then execution returns to step 1. In case a change request has not been issued in step 1, the camera 5 acquires the signal level LTnew of the latest image (step 4) and outputs it to the controller 8 then execution returns to step 1.

Control operation of compression/transmission based on the picture signal level determination by the image server is described below referring to FIG. 12. After a request for a change of exposure time is made and the change of the exposure time is set, it is checked whether an image output from the picture signal processor 54 is the first image after the change of exposure time (step 11). In case the image output is the first image after the change of exposure time, the signal level LTnew is acquired by the signal level detector 541 (step 12) and output to the controller 8. Then the image capture control means 84 starts capture operation (step 13). Next the transient state controller 84 calculates (LTnew−LTold)/LTold from the signal levels LTnew and LTold, and checks whether the calculated value falls within the reference range (step 14). In case the value is within the reference range, assuming that variations in the signal level at switchover between exposure modes have terminated, the transient state controller 84 completes the status of the first image processing after the change of exposure time (step 15), compresses the image data in the image data transmitter 6, and transmits the image data via the network interface 9 (step 16). In case the calculated value is not within the reference range in step 14, execution returns to step 11. In case the image output from the picture signal processor 54 is not the first image after the change of exposure time in step 15, assuming that switchover between exposure modes is over, the transient state controller 84 completes the status of the first image processing after the change of exposure time.

Described below is the control operation of compression/transmission by counting the number of images after change of exposure time using a counter instead of compression/transmission based on the determination of the image signal level. As shown in FIG. 13, after a request for a change in exposure time is issued and setting of the exposure time is changed, it is checked whether the image output from the picture signal processor 54 is the first image after the change of exposure time (step 21). The counter is set to 0 as an initial value. In case the image is the first one after the change of exposure time in step 21, the transient state controller 84 checks whether the counter has reached a predetermined reference value (step 22). In case the counter has not yet reached the reference value, the transient state controller 84 increments the counter by 1 (step 23) then control returns to step 21. In case the counter has reached the predetermined reference value in step 22, assuming that variations in the signal level at switchover between exposure modes have terminated, the transient state controller 84 completes the status of the first image processing after the change of exposure time (step 24), compresses the image data in the image data transmitter 6, and transmits the image data via the network interface 9 (step 25). In case the image output from the picture signal processor 54 is not the first image after the change of exposure time in step 21, execution proceeds to step 25. Assuming that switchover between exposure modes is over, the transient state controller 84 completes the status of the transient image processing after the change of exposure time.

In this way, the image server and the image server system according to Embodiment 5 can halt compression of image data and transmission of compressed data until the image signal level settles at a level within the predetermined reference range after the change of exposure time so as not to output several images with large variations in brightness when the normal exposure mode is switched to the long exposure mode. This transmits only a stable high-quality image at switchover between exposure modes.

Embodiment 6

An image server according to Embodiment 6 of the invention enables/disables the capture control means 6 to halt transmission of an image. In case capture of an image is not performed, compression or transmission of an image is not carried out. FIG. 14 illustrates the signal level output from the image server in the long exposure mode and its data transmission in Embodiment 6 of the invention. Configuration of the image server according to Embodiment 6 is basically the same as that in Embodiment 5 and same signs show the same components. Thus Embodiment 6 refers to FIGS. 1 and 2 also.

Figure 14:
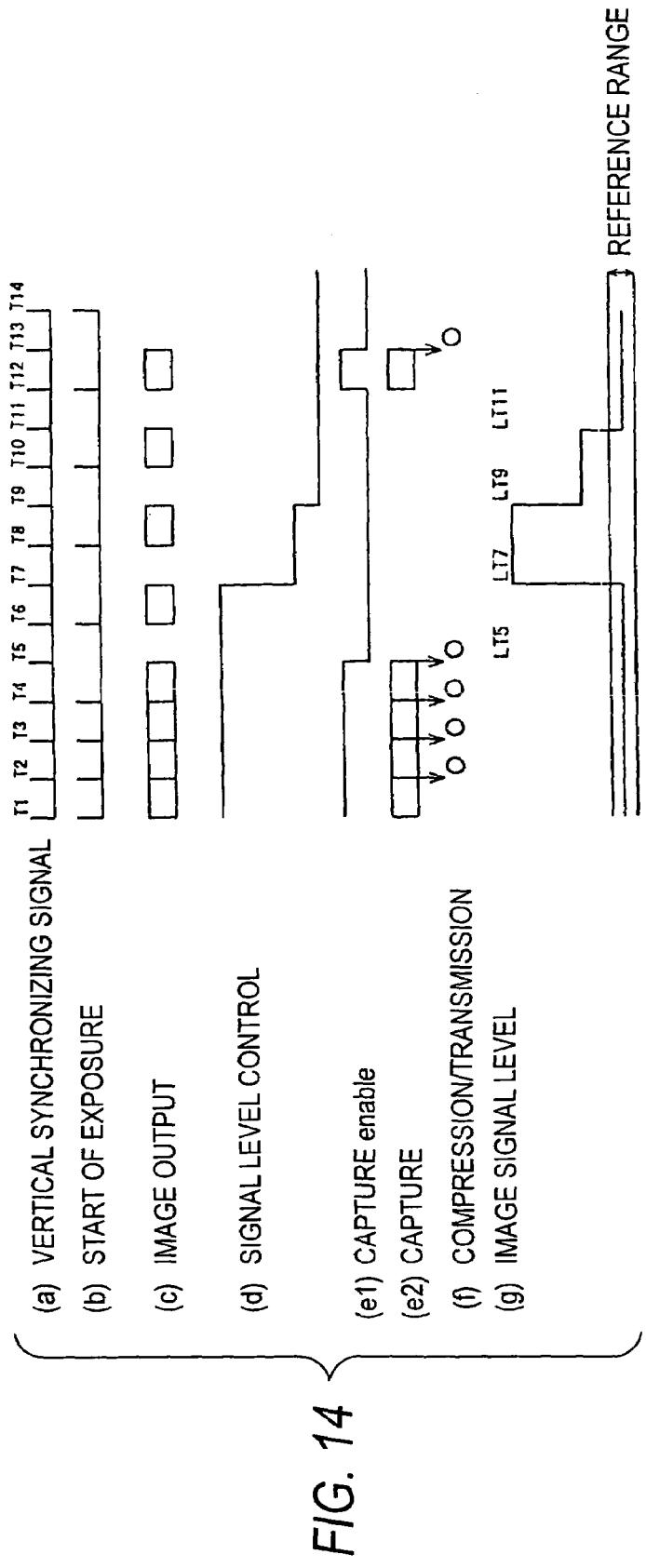
FIG. 14 illustrates the output signal level and its data transmission of the image server according to Embodiment 6 of the invention in the long exposure mode.

T1 through T4 shown in FIG. 14 are vertical synchronizing timings as a reference for operation of an image server. Part (b) shows the exposure start timing and T1 through T4 correspond to the normal exposure mode. As shown in part (e1), capture operation is enabled. The High level of the signal corresponds to the enable mode. At T5 in part (e1), readout of a picture signal (Image Read) from the imaging device 51 is halted and the long exposure mode having the exposure time double that of the normal exposure mode is selected. Capture operation is also disabled. As shown in part (c), the picture signal from the imaging device 5a is read with the timing T6.

A picture signal in the normal exposure mode at each of T1 through T4 is captured by the image capture control means 61 and compressed/transmitted with the timings T2 through T5 as shown in part (f). The signal level of the image signal captured at T6 is based on the long exposure mode. The exposure time is longer than in the normal exposure mode, so that the signal level detected by the signal level detector 541 is high as shown at T7 in part (g). The picture signal level adjustment means 53 performs level adjustment so as to decrease the gain of the signal level of the picture signal captured after T8, based on the signal level detected by the signal level detector 541. With the timing T11, the picture signal level in the long exposure settles at a predetermined level. When the signal level falls within the reference range, capture operation is enabled. Capture operation is restarted in synchronization with the picture signal output from the picture signal processor 54. Compression/Transmission of the image signal is restarted.

In the period from time points T5 through T11, the picture signal level is high as shown in FIG. 10. Compressing the picture signal without level adjustment and transmitting the compressed signal will result in output of a picture signal of an irregular level caused by a rapid increase in the picture signal level, which gives a sense f incongruity. This is why the picture quality is degraded on the related art image server in switchover between exposure modes.

In case the camera 5 and the image data transmitter 6 are provided in separate blocks, it is possible to enable/disable the capture operation of the image capture control means 61 by way of a capture control signal with control made easy. The change volume of signal level when the exposure time is changed can be estimated so that the period up to the time point where the signal level settles in the reference range can be estimated to some degree. Instead of monitoring that the signal level falls within the reference range, the time period starting with the change of exposure time may be monitored and image transmission started when a predetermined time has elapsed.

Figure 15:
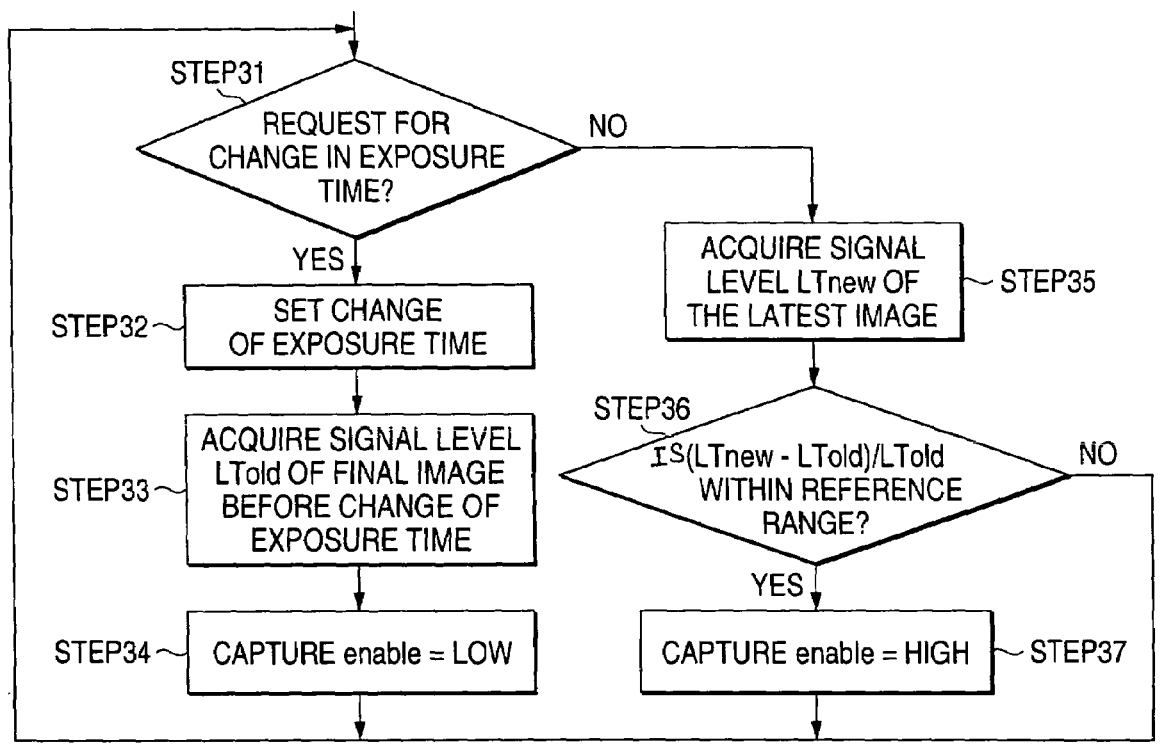
FIG. 15 is a flowchart of the exposure control operation of the camera according to Embodiment 6 of the invention.
Figure 16:
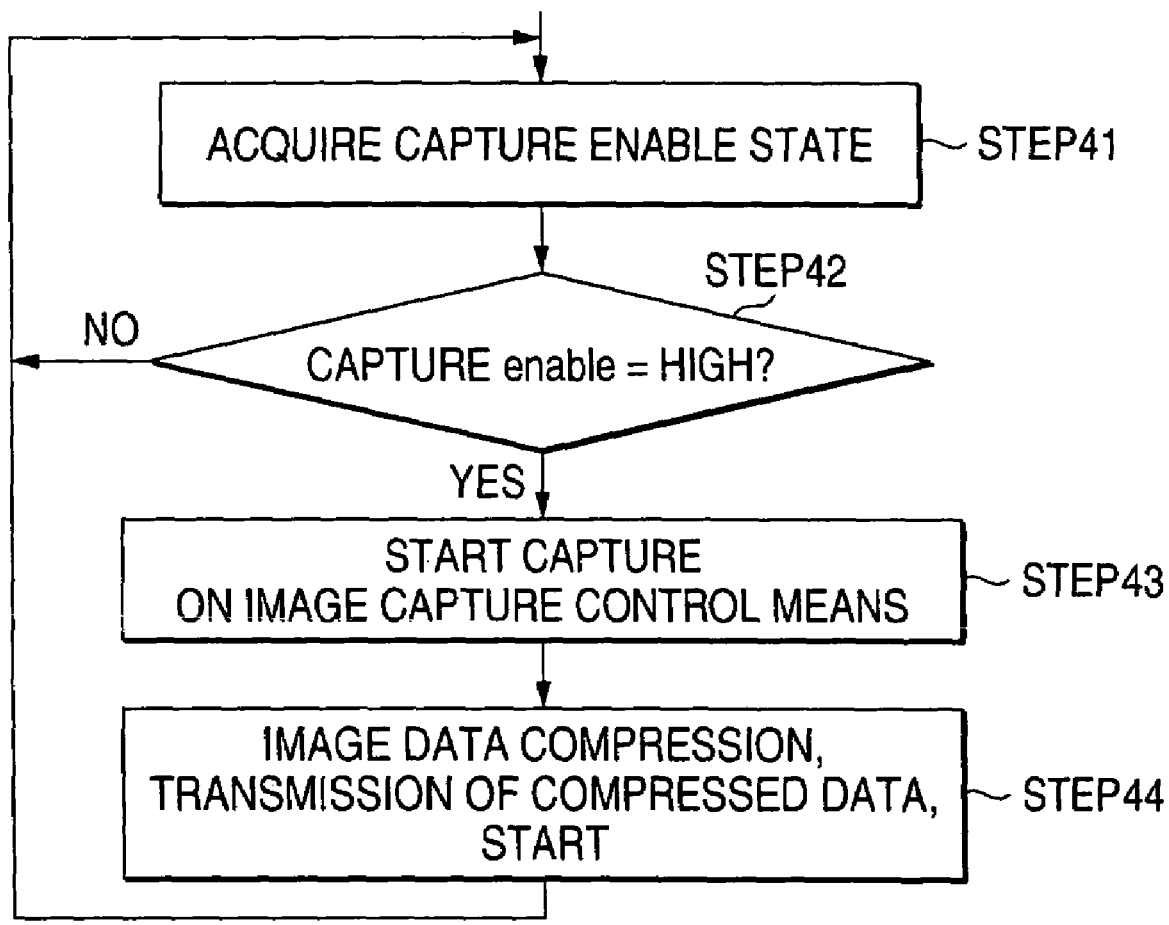
FIG. 16 is a flowchart of control operation of compression/transmission based on the signal level determination by the image server according to Embodiment 6 of the invention.
Figure 17:
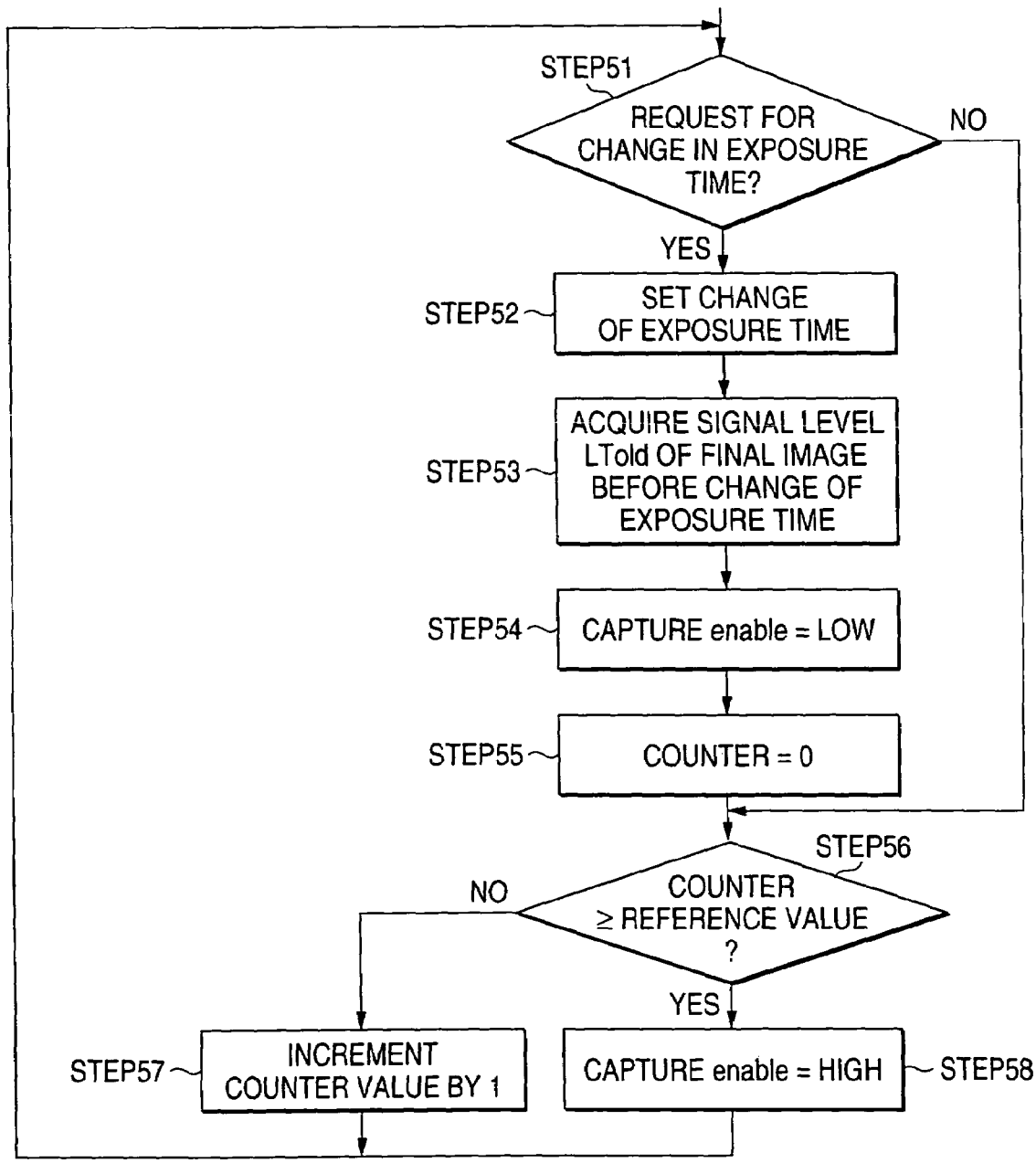
FIG. 17 is a flowchart of compression/transmission by using the counter of the image server according to Embodiment 7 of the invention.

Control operation of the image server according to Embodiment 6 is described below. FIG. 15 is a flowchart of the exposure control operation of the camera according to Embodiment 6 of the invention. FIG. 16 is a flowchart of control operation of compression/transmission based on the signal level determination by the image server according to Embodiment 6 of the invention. FIG. 17 is a flowchart of compression/transmission by using the counter of the image server according to Embodiment 6 of the invention.

Exposure control operation of the camera 5 is described below referring to FIG. 15. The controller 8 checks whether a request for change of exposure time has been issued to the image server in the standby state from the network (step 31).

In case the request has been issued, the controller 8 sets the change of exposure time (step 32) to adjust the exposure time. The controller 8 acquires the signal level LTold of the final image before the change of exposure time (step 33). The transient state controller 84 drives LOW the capture enable for the image capture control means 61 (step 34) and execution returns to step 31.

In case a change request has not been issued in step 31, the camera 5 acquires the signal level LTnew of the latest image (step 35). The transient state controller 84 calculates (LTnew−LTold)/LTold from the signal levels LTnew and LTold, and checks whether the calculated value falls within the reference range (step 36). In case the value is within the reference range, assuming that variations in the signal level at switchover between exposure modes have terminated, the transient state controller 84 drives the capture enable HIGH (step 37) and waits in step 31 again. In case the value is out of the reference range, the transient state controller 84 also waits in step 31 again.

Control operation of compression/transmission by way of a capture control signal of the image server is described below referring to FIG. 16. After a request for a change in exposure time is issued and the change of exposure time is set, the capture enable state is acquired (step 41). This process is repeated until the acquired capture enable state is driven HIGH (step 42), then the image capture control means 84 starts capture operation (step 43). Then the image data is compressed in the transmission means 6 and transmitted from the network interface9 (step 44).

Described below is the exposure control operation by counting the number of images after change of exposure time using a counter (not shown) instead of exposure control operation based on the determination of the signal level in steps 31 through 37. As shown in FIG. 17, the controller 8 checks whether a request for change of exposure time has been issued to the image server in the standby state from the network (step 51). In case the request has been issued, the controller 8 sets the change of exposure time (step 52) to adjust the exposure time. The controller 8 acquires the signal level LTold of the final image before the change of exposure time (step 53). The transient state controller 84 drives LOW the capture enable for the image capture control means 6a (step 54) and sets the counter to 0 as an initial value (step 55). It is checked whether the counter value is equal to or more than the reference value (step 56). In case the counter value is smaller than the reference value, the counter value is incremented by 1 (step 57), then execution returns to step 51. In case the counter value is equal to or more than the reference value, the capture enable is driven HIGH (step 58) and execution returns to step 51 again where the image server waits in the standby state.

In this way, according to Embodiment 6, once switchover has taken place between exposure modes, while the signal level is detected by the signal level detector 541 and it is determined that the signal level is out of the reference range by the transient state controller 84, the image capture control means 61 is disabled to halt capture operation thereby halting compression/transmission of an image signal. Thereafter, in case it is determined that the signal level has fallen within the reference range, several images with large variations in brightness are output from the imaging device 51 when the normal exposure mode is switched to the long exposure mode in order to restart compression and transmission of the image signal. Note that the images are not transmitted to the user of the image server until the image signal level has settled at a level in the predetermined reference level.

Embodiment 7

An image server according to Embodiment 7 of the invention enables/disables the image capture operation to halt transmission of an image, same as the image server in Embodiment 5. The picture signal level adjustment means 5c is forcibly changed in a rapid fashion when the exposure time is changed, in order to improve the responsivity to a change in signal level.

Figure 18:
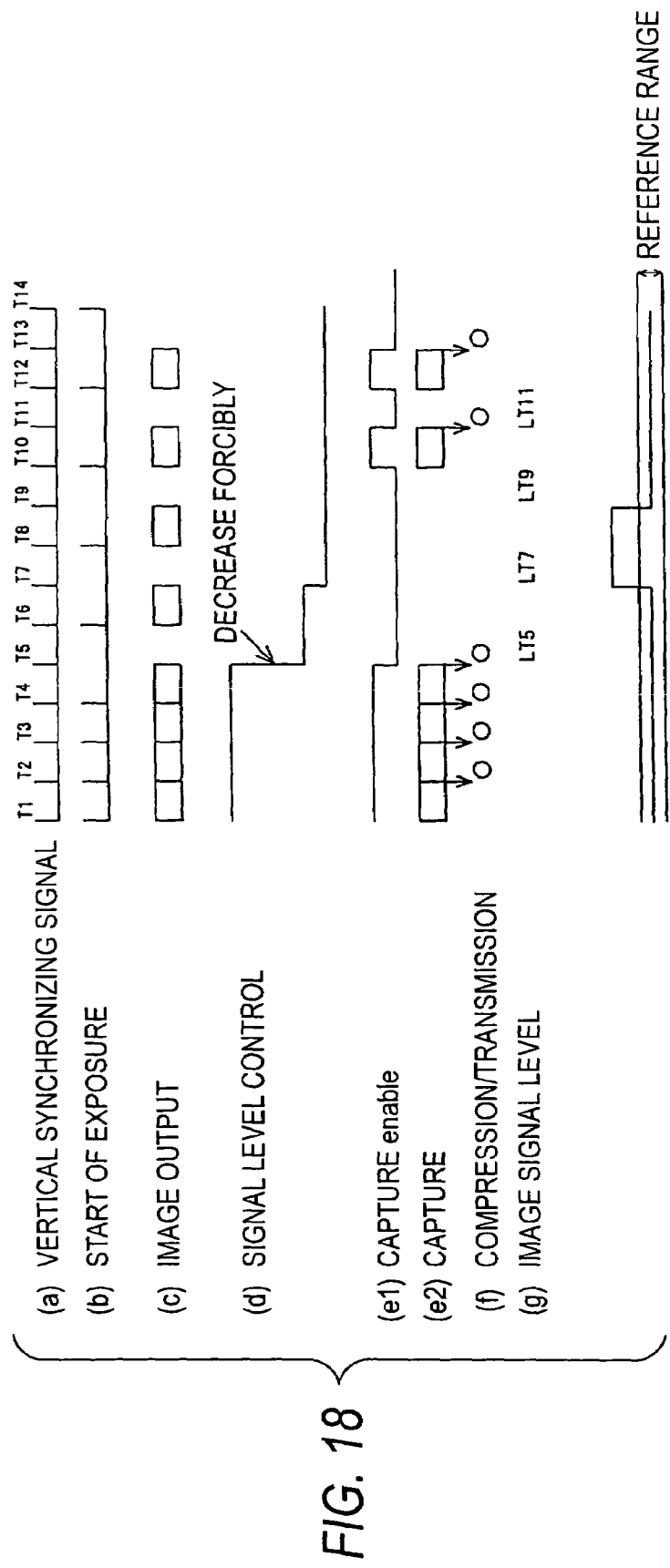
FIG. 18 illustrates the output signal level and its data transmission of the image server according to Embodiment 8 of the invention in the long exposure mode.

FIG. 18 illustrates the signal level output from the image server in the long exposure mode and its data transmission in Embodiment 7 of the invention. Configuration of the image server according to Embodiment 7 is basically the same as that in Embodiment 6 and same signs show the same components. Thus Embodiment 7 refers to FIGS. 1 and 2 also.

T1 through T4 are based on the normal exposure mode and capture operation is enabled as shown in part (e1) in FIG. 15. The High level of the signal corresponds to the enable mode. At T5 in part (e1), readout of a picture signal (Image Read) from the imaging device 51 is halted and the long exposure mode having the exposure time double that of the normal exposure mode is selected. Capture operation is also disabled. As shown in part (c), the picture signal from the imaging device 51 is read with the timing T6.

The signal level of the image signal captured at T6 is based on the long exposure mode. The exposure time is longer than in the normal exposure mode, so that the signal level detected by the signal level detector 541 is high as shown at T7 in part (g). A change in signal level is estimated before T6. In accordance with an instruction from the picture signal level controller 85, the picture signal level adjustment means 53 decreases the signal level by the estimated change in signal level. This estimation is made based on the change ratio of exposure time. For example, when the normal exposure mode is switched to the long exposure mode having the exposure time double that of the normal exposure mode, the brightness is expected to be about twofold, so that a gain is set to reduce the signal level to half. When the signal level falls within the reference range, the capture operation is enabled and image signal capture is restarted in synchronization with the picture signal output. Compression/Transmission of an image signal is restarted at the same time.

In the period from time points T5 through T11, the signal level is high as shown in part (g). Transmitting the signal without level adjustment will result in a rapid increase in the image signal level, which gives a sense f incongruity. According to the image server in Embodiment 7, the picture signal level adjustment means 51 forcibly decreases the signal level and the image capture control means 61 is disabled, thus it is possible to halt compression/transmission of an image signal.

In case the camera 5 and the image data transmitter 6 are provided in separate blocks, it is possible to enable/disable the capture operation of the image capture control means 61 by way of a capture control signal with control made easy. The change volume of signal level when the exposure time is changed can be estimated so that the period up to the time point where the signal level settles in the reference range can be estimated to some degree. Instead of monitoring that the signal level falls within the reference range, the time period starting with the change of exposure time may be monitored and image transmission started when a predetermined time has elapsed.

It is possible to previously suppress a change in signal level by forcibly changing the signal level, so that it is possible to output an image of a stable level to a network despite transient level instability by improving the response to a change in signal level caused by a change in exposure time.

While capture operation is enabled/disabled in Embodiment 7, a system may be employed where all image signals are captured but transmission of an image signal to the network is controlled depending on the detected picture signal level, same as Embodiment 5.

Embodiment 8

Figure 19:
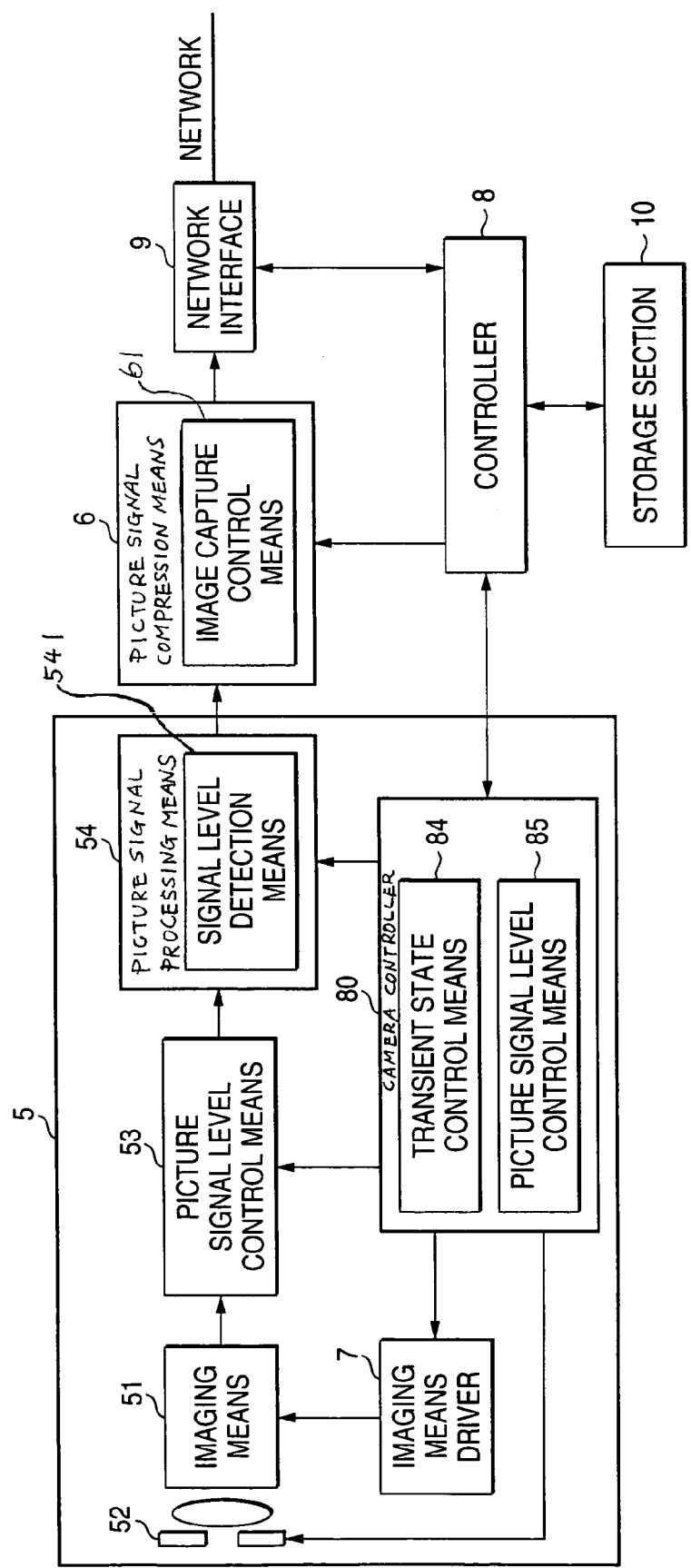
FIG. 19 illustrates the output signal level and its data transmission of the image server according to Embodiment 5 of the invention in the long exposure mode.

Embodiment 8 of the invention is an image server of Embodiment 5 except that a built-in server is omitted. FIG. 19 illustrates the signal level output from the image server in the long exposure mode and its data transmission in Embodiment 3 of the invention. Components having the same signs as those of the image server in Embodiment 5 shown in FIGS. 1 and 2 show the same component, so that the detailed description is omitted.

Referring to FIG. 19, a numeral 80 represents a camera controller for controlling a camera 5 separate from the image server which photographs a subject and outputs an image signal. The camera controller 80 drives the imaging device 51 of the camera 5, controls the picture signal processor 54, controls the light quantity adjustment means 52 (AE) and performs AGC/AWB control at specific levels.

The controller 8 performs control to change the image compression mode and generate HTML data and image data in accordance with an instruction by the browser running on the client terminal 2 transmitted from the network 3 via the network interface 9. In order to compress an image signal and transmit image data in the same cycle as the image signal, the controller 8 instructs the camera controller 80 to control the imaging device 51, picture signal processor 54, light quantity adjustment means 52, and perform AGC/AWB control.

In this way the image server of Embodiment does not have a built-in camera 5 and may have an external camera. Thus various image servers may be provided through combination with the camera 5, which assures convenience.

While the picture signal level is controlled as AGC control by the picture signal level adjustment means 53 when the exposure time is changed in Embodiments 5 through 8, the light quantity adjustment means 52 may be used to change the quantity of light input to the imaging device 51 thereby controlling the picture signal level.

While the change in exposure time is described as a change in exposure time concerning a longer exposure time than the normal exposure time in Embodiments 5 through 8, the same control may be made on a change in exposure time concerning a shorter exposure time than the normal exposure time, such as a change in exposure using a shutter feature of the imaging device 51.

According to the above-mentioned embodiments, when the exposure time has changed, the image data indicating the signal level of the transient state is transmission-adjusted by the transient state controller. This transmits a stable high-quality image rather than an image which gives a visual sense of incongruity even when the exposure time has rapidly changed.

It is thus possible to transmit a stable high-quality image rather than an image which gives a visual sense of incongruity even when the exposure time has rapidly changed.

Transmission control is made in accordance with the output of the timer means despite a rapid change in exposure time, thereby transmitting a stable high-quality image.

Transmission control is made in accordance with the counted output of the counter means despite a rapid change in exposure time, thereby transmitting a stable high-quality image.

Capture operation is halted by the transient state controller despite a rapid change in exposure time, thereby transmitting a stable high-quality image.

Compression is halted by the transient state controller despite a rapid change in exposure time, thereby transmitting a stable high-quality image.

It is possible to previously suppress a change in signal level, so that it is possible to output an image of a stable level to a network despite transient level instability by improving the response to a change in signal level caused by a change in exposure time.

Image capture control is readily performed by way of a timing signal generated by the timing signal generation means.

The image data indicating the signal level in the transient state is not captured by the transient state controller. It is thus possible to transmit a stable high-quality picture rather than an image which gives a visual sense of incongruity.

It is thus possible to transmit a stable high-quality image rather than an image which gives a visual sense of incongruity even when the exposure time has rapidly changed. Operation of switchover from the normal exposure mode to the long exposure mode may be performed by the client through manual observation of an image. For example, when an exposure mode selector button is specified from the input means of the client, the selection information is transmitted to the image server.

Based on the selection information transmitted from the client, the image server switches to the mode different from the current exposure mode (from the normal exposure mode to the long exposure mode; or from the long exposure mode to the normal exposure mode).

The exposure mode selector button is transmitted as screen display information from the image server. The client displays the exposure mode selector button on the display based on the information.

As mentioned above, operation of switchover from the normal exposure mode to the long exposure mode may be performed by the client through manual observation of an image. The following describes a method for automatically switching from the normal exposure mode to the long exposure mode and a method for automatically switching from the long exposure mode to the normal exposure mode:

First, a switching method by way of AGC on the image signal processing means 5d is described below referring to FIG. 20.

Figure 20:
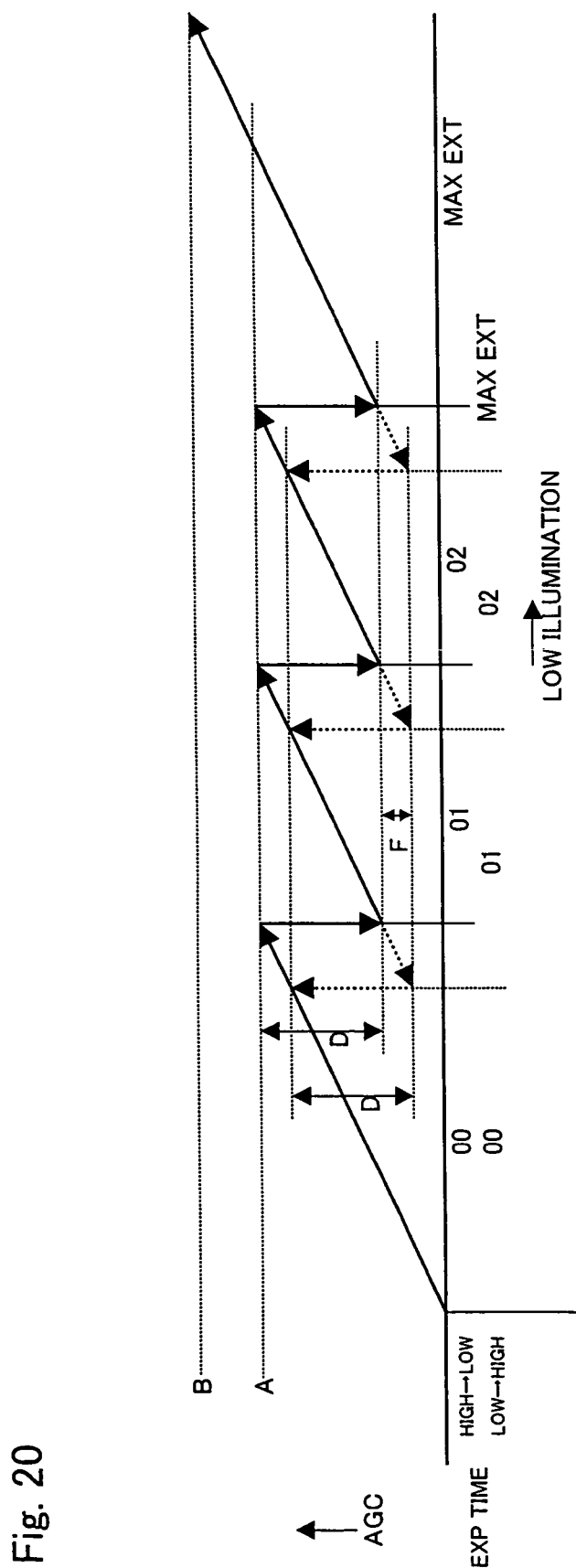
FIG. 20 shows the exposure time control in the long exposure mode by way of the AGC value.

FIG. 20 shows the exposure time control in the long exposure mode by way of the AGC value. When the illumination of a subject drops, increase of gain starts. When the illumination of the subject further has dropped and the AGC control value has reached A, the exposure time is increased (the exposure time parameter is incremented by 1), and the AGC value is decremented by C with respect to the image signal in the new exposure time. In case the illumination of the subject has further dropped, the exposure time is increased again (the exposure time parameter is incremented by 1), and the AGC value is decremented by C with respect to the image signal. The decrement C of the AGC value is made equivalent to the volume of increase in the image level due to long exposure so as to reduce the variation in the image level actually output. When the longest exposure time is set (MAX EXT setting in the above figure), the AGC gain is increased to a maximum value of (B) even in case the AGC value reaches A.

Conversely, when the illumination of the subject has risen and the AGC value has become A−(C+F), the exposure time is decreased (the exposure time parameter is decremented by 1), and the AGC value is incremented by C with respect to the image signal. In case the illumination of the subject has further risen, the exposure time is decreased again (the exposure time parameter is decremented by 1), and the AGC value is incremented by C with respect to the image signal.

In case the illumination of the subject has risen in the normal exposure mode (1/60s), state transition is made to Iris control, same as the normal exposure mode.

An exposure time of 01 or above corresponds to long exposure in the above example. That is, the AGC level is used to determine a drop in the illumination of the subject and state transition is made to the long exposure mode. By assuming the AGC level A in the above figure as AGC MAX value B, it is possible to lower the illumination level where switchover to long exposure takes place and suppress the reduction of frame rate due to low illumination. The series of control is made by the controller 8.

Next, a switching method by way of the detection level of the signal level detector 5d1 is described below referring to FIG. 21.

Figure 21:
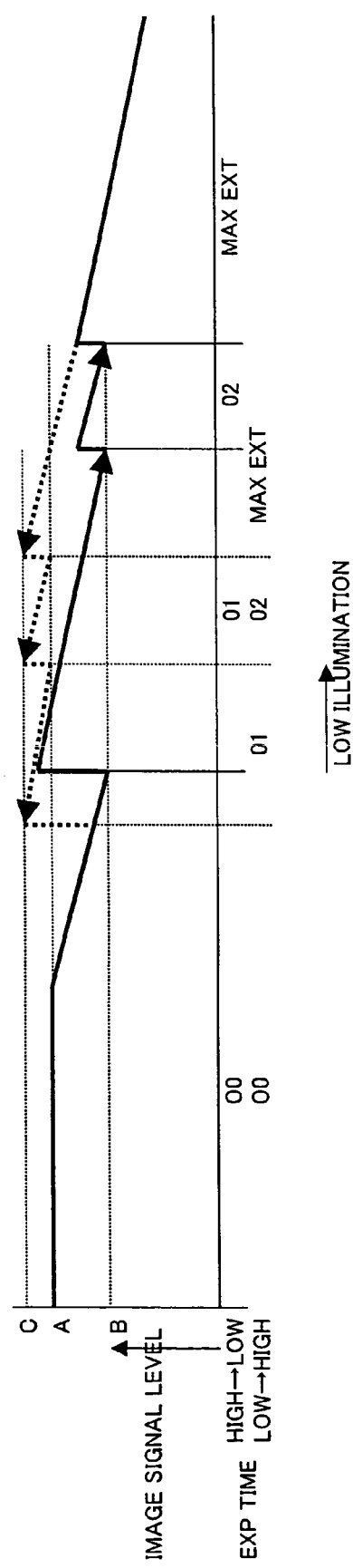
FIG. 21 shows the exposure time control in the long exposure mode by way of the image signal level.

FIG. 21 shows the exposure time control in the long exposure mode by way of the image signal level.

Controls such as AGC work even in low illumination to retain the image signal at a constant level (A). When the illumination has further dropped and AGC has reached MAX, the image signal level starts to drop. When the image signal level has reached a predetermined value B, the long exposure (01) is selected. Then the image level rises. As the illumination further drops, the image level drops to Level B, where the exposure time is switched to 02. This causes the image signal to rise again. When the illumination has further dropped and the image signal level B is reached, the maximum exposure time: MAX EXT is selected. In the maximum exposure time, the image signal level continues to drop as the illumination further drops.

Conversely, when the illumination of the subject has risen and the image signal level rises to reach Level C in the long exposure mode, a shorter exposure time is selected. For example, in the case of r exposure time: MAX EXT in the above figure, the exposure time 02 is selected. Switching to the shorter exposure time 02 causes the image signal level to drop temporarily. When the illumination of the subject further rises, the exposure time is switched: 02 to 01 to 00 (normal exposure).

In this way, by switching between exposure times by using the image signal level, it is possible to automatically switch from the normal exposure mode to the long exposure mode or switch from the long exposure mode to the normal exposure mode. The series of control is made by the controller 8 based on the information from the signal level detector 5d1 of the image signal processing means 5d.

In the embodiments of this invention, the imaging means is implemented by a CCD or a CMOS image sensor. Available products are MN39143FT (Matsushita Electric Industrial Co., LTD.), ICX228AK (Sony Corporation), and MN39321PD (Matsushita Electric Industrial Co., LTD.).

The image signal level means is implemented by an AFE (Analog Front End). Available products are CXA2006Q (Sony Corporation), AD9898 (Analog Devices, Inc.), HD49334 (Hitachi, Ltd.), and IR3Y50M (SHARP CORPORATION).

As image signal processing means, HD49815 (Hitachi, Ltd.), CXD2163BR (Sony Corporation), and LR38603A (SHARP CORPORATION) are available.

The image signal compressor is implemented by a JPEG compressor. Available products are MD2208 (FUJIFILM Microdevices Co., Ltd.) and LC82210 (SANYO Electric Co., Ltd.).

The control means is implemented by a microcomputer. Available products are HD64F2238 (Hitachi, Ltd.), HD6417709 (Hitachi, Ltd.), and MN103E010HRA (Matsushita Electric Industrial Co., LTD.).

The storage section is implemented by a memory. Available products are MT48LC4M16A2 (Micron Technology, Inc.), MT48LC8M16A2 (Micron Technology, Inc.), MSM51V18165D (Oki Electric Industry Co., Ltd.), and HY5DV641622 (Hynix Semiconductor Inc.).

The network interface is implemented by a LAN controller. Available products are RTL8019AS (Realtek Semiconductor Corp.), LAN91C113I (SMSC), and LAN91C96 (SMSC).

As mentioned above, according to the camera apparatus, an image server and an image server system of the invention, it is readily possible to calculate the correction volume based on the exposure time and signal level. The control value of the picture signal level controller is adjusted using this level correction volume thus allowing proper AGC control and AWB control in accordance with the exposure time and providing signal level adjustment in the long exposure mode in a short period. It is thus possible to maintain high controllability despite a change in exposure time and transmit a stable high-quality image even in case a rapid change has taken place in brightness. A reference table or a function is used for processing, which makes easy the calculation of the correction volume. It is thus possible to provide an image server system capable of performing proper picture signal level adjustment in accordance with the exposure time.

Further, it is possible to transmit a stable high-quality image without outputting an image of an irregular level when the exposure time has been changed.

What is claimed is:

1. An image server comprising:
   imaging device for converting an incident light into electric signals;
   signal level detector for detecting the signal level of a picture signal output from said imaging device;
   picture signal level controller for adjusting the level of a picture signal output from the imaging device;
   picture signal compressor for compressing a picture signal output from said picture signal level controller to output image data;
   focus position controller for determining a focus position based on a maximum value of focus evaluation detected by said picture signal level detector; and
   a focus lens driver for moving a focus lens in predetermined control volumes based on an instruction from said focus position controller;
   wherein in case the exposure time is changed to a longer cycle than a predetermined cycle, said focus position controller determines a large control volume corresponding to said change in exposure time and moves the focus lens with the control volume to detect said maximum value of focus evaluation and performs focus control.

2. The image server according to claim 1, wherein said focus position controller moves the focus lens in predetermined control volumes, calculates a change volume between the focus evaluation values before and after a change in control volume, obtain a focus evaluation value change ratio indicating the change in control volume, and determines as a focus position the position of the focus lens immediately preceding the position where the focus evaluation value change ratio is reversed from positive to negative.

3. The image server according to claim 1, wherein in case the exposure time of said imaging device is changed to output a picture signal in a longer cycle than a predetermined cycle, when said focus evaluation change ratio has dropped below a predetermined value, said focus position controller reduces the control volume.

4. The image server according to claim 3, wherein when said focus evaluation change ratio has dropped below a predetermined value, said focus position controller reduces the control volume to that in said predetermined cycle.

5. The image server according to claim 1, wherein said focus evaluation value is a high-frequency component of a picture signal detected by said signal level detector.

6. An image server system comprising: the image server according to claim 1; a client terminal capable of acquiring image data from the image server; and a network to which said image server and said client terminal are connected.

7. Camera apparatus comprising:
   imaging device for converting an incident light into electric signals;
   signal level detector for detecting the signal level of a picture signal output from said imaging device;
   picture signal level controller for adjusting the level of a picture signal output from the imaging device;
   picture signal compressor for compressing a picture signal output from said picture signal level controller to output image data; and
   control level adjuster is provided for determining the correction volume used by said picture signal level controller in level adjustment of a picture signal,
   wherein in case the exposure time of said imaging device is changed to output a picture signal in a longer cycle than a predetermined cycle, said control level adjuster determines the correction volume in accordance with the exposure time and the signal level detected by said signal level detector and said picture signal level controller performs level adjustment of a picture signal by using the correction volume.

8. The camera apparatus according to claim 7 further comprising:
   picture signal processor for processing and outputting a picture signal output from said picture signal level controller;
   image signal compressor for compressing an output signal from said picture signal processor;
   external interface for externally transmitting image data encoded by said picture signal compressor; and
   a controller for controlling said picture signal level controller, said picture signal processor, said image signal compressor and said external interface,
   wherein in case the exposure time of said imaging device is changed to output a picture signal in a longer cycle than a predetermined cycle, acquisition and adjustment of the signal level are made in a time equivalent to that in which a picture signal is output.

9. The camera apparatus according to claim 7, wherein in case the exposure time of said imaging device is changed to output a picture signal in a longer cycle than a predetermined cycle, said control level adjuster determines the correction volume determines the correction volume in the longer cycle based on a preset reference table or function and said picture signal level controller uses the correction volume to perform level adjustment.

10. The camera apparatus according to claim 9, wherein said camera apparatus determines the correction volume by using said reference table of function according to the change ratio of the signal level of said picture signal, on top of the exposure time and the signal level of said picture signal.

11. The camera apparatus according to claim 7, wherein said reference table or arithmetic operation is configured so that the correction volume will decrease as the difference between the output signal level and the reference level decreases.

12. The camera apparatus according to claim 7, wherein said control level adjuster changes the correction volume for signal level adjustment in the brightness control of a picture signal.

13. The camera apparatus according to claim 7, wherein said control level adjuster changes the correction volume for signal level adjustment in the white balance control.

14. An image server which is the camera apparatus according to claim 7, wherein said image server comprises an interface for connecting to a network as an external interface.

15. An image server system comprising: the image server according to claim 14; a client terminal capable of acquiring image data from the image server; and a network to which said image server and said client terminal are connected.

16. An image server connected to a network, said image server outputting camera image data to the network, comprising:
   imaging device for converting an incident light into electric signals;
   picture signal level controller for automatically adjusting the signal level of a picture signal output from the imaging device;
   signal level detector for detecting the signal level of the image signal level-adjusted by said picture signal level controller;
   image data transmitter for capturing and compressing the picture signal whose signal level is adjusted by said picture signal level controller, converting the picture signal to a predetermined image data format, and transmitting the resulting signal to the network;
   exposure controller for controlling the exposure time of said imaging device; and
   transient state controller for controlling the image data transmitter when the exposure time is changed by said exposure controller.

17. The image server according to claim 16, wherein when said exposure controller has changed the exposure time, said transient state controller controls the image data transmitter so as to halt transmission of image data to the network until the signal level detected by said signal level detector is settled at a predetermined level by the picture signal level controller.

18. The image server according to claim 16, wherein said transient state controller comprises timer means for measuring the time elapsed after said exposure controller has changed the exposure time and performs transmission control of image data in the transient state in accordance with the output of said timer means when the exposure time is changed.

19. The image server according to claim 16, wherein said transient state controller comprises counter means for counting the synchronizing signal after the exposure time is changed and performs transmission control of image data in the transient state in accordance with the count output of said counter means when the exposure time is changed.

20. The image server according to claim 17, wherein when said exposure controller has changed the exposure time, said transient state controller controls the image data transmitter so as to halt capture of a picture signal output from said imaging device.

21. The image server according to claim 17, wherein when said exposure controller has changed the exposure time, said transient state controller controls the image data transmitter so as to halt compression of a picture signal output from said imaging device.

22. The image server according to claim 16, wherein when said exposure controller has changed the exposure time, said picture signal level controller estimates the change in signal level in accordance with the change ratio of the exposure time and operates the image signal level adjustment means so as to adjust the signal level of the picture signal by the estimated change in signal level.

23. The image server according to claim 16, wherein said transient state controller comprises timing signal generation means for generating a timing signal for capturing a picture signal output from said imaging device.

24. The image server according to claim 16, wherein said transient state controller halts generation of a timing signal from said timing signal generation means until said image level settles.

25. An image server system comprising: the image server according to claim 16; a client terminal capable of acquiring image data from the image server; and a network to which said image server and said client terminal are connected.

26. An image server comprising:
   imaging means for converting an incident light into electric signals;
   signal level detection means for detecting the signal level of a picture signal output from said imaging means;
   picture signal level control means for adjusting the level of a picture signal output from the imaging means;
   picture signal compression means for compressing a picture signal output from said picture signal level control means to output image data;
   focus position control means for determining a focus position based on a maximum value of focus evaluation detected by said picture signal level detection means; and
   a focus lens driver for moving a focus lens in predetermined control volumes based on an instruction from said focus position control means;
   wherein in case the exposure time is changed to a longer cycle than a predetermined cycle, said focus position control means determines a large control volume corresponding to said change in exposure time and moves the focus lens with the control volume to detect said maximum value of focus evaluation and performs focus control.

27. Camera apparatus comprising:
   imaging means for converting an incident light into electric signals;
   signal level detection means for detecting the signal level of a picture signal output from said imaging means;
   picture signal level control means for adjusting the level of a picture signal output from the imaging means;
   picture signal compression means for compressing a picture signal output from said picture signal level control means to output image data; and control level adjustment means is provided for determining the correction volume used by said picture signal level control means in level adjustment of a picture signal, wherein in case the exposure time of said imaging means is changed to output a picture signal in a longer cycle than a predetermined cycle, said control level adjustment means determines the correction volume in accordance with the exposure time and the signal level detected by said signal level detection means and said picture signal level control means performs level adjustment of a picture signal by using the correction volume.

28. An image server connected to a network, said image server outputting camera image data to the network, comprising:

imaging means for converting an incident light into electric signals;

picture signal level control means for automatically adjusting the signal level of a picture signal output from the imaging means;

signal level detection means for detecting the signal level of the image signal level-adjusted by said picture signal level control means;

image data transmission means for capturing and compressing the picture signal whose signal level is adjusted by said picture signal level control means, converting the picture signal to a predetermined image data format, and transmitting the resulting signal to the network;

exposure control means for controlling the exposure time of said imaging means; and transient state control means for controlling the image data transmission means when the exposure time is changed by said exposure control means.

* * * * *